US009088824B2

(12) United States Patent
Soroushian

(10) Patent No.: US 9,088,824 B2
(45) Date of Patent: *Jul. 21, 2015

(54) SYSTEMS AND METHODS FOR PROVIDING A CUSTOMIZED PROGRAM LINEUP

(71) Applicant: Rovi Guides, Inc., Santa Clara, CA (US)

(72) Inventor: Kourosh Soroushian, San Diego, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/478,888

(22) Filed: Sep. 5, 2014

(65) Prior Publication Data

US 2015/0058891 A1    Feb. 26, 2015

Related U.S. Application Data

(63) Continuation of application No. 13/528,144, filed on Jun. 20, 2012, now Pat. No. 8,856,847.

(51) Int. Cl.
*H04N 5/445* (2011.01)
*H04N 21/458* (2011.01)
*H04N 21/482* (2011.01)
*H04N 21/426* (2011.01)
*H04N 21/472* (2011.01)
*H04N 21/262* (2011.01)
*H04L 29/06* (2006.01)
*H04N 21/2543* (2011.01)

(52) U.S. Cl.
CPC .............. *H04N 21/458* (2013.01); *H04L 65/60* (2013.01); *H04N 21/2543* (2013.01); *H04N 21/26258* (2013.01); *H04N 21/42646* (2013.01); *H04N 21/42661* (2013.01); *H04N 21/472* (2013.01); *H04N 21/47214* (2013.01); *H04N 21/482* (2013.01); *H04N 21/4825* (2013.01)

(58) Field of Classification Search
None
See application file for complete search history.

(56) References Cited

U.S. PATENT DOCUMENTS

2003/0177495 A1    9/2003 Needham et al.
2009/0144784 A1    6/2009 Li et al.

*Primary Examiner* — John Schnurr
*Assistant Examiner* — Cynthia Fogg
(74) *Attorney, Agent, or Firm* — Ropes & Gray LLP

(57) ABSTRACT

Systems and methods for delivering content according to a customized program lineup are provided. A content source transmits a plurality of media assets in a first schedule according to scheduled transmission times. A processing device may receive a user input to receive the media assets in a second schedule different from the first schedule. When a request to access the content source is received, the processing device may automatically determine, based on the second schedule, whether the user has requested a different media asset than the originally-scheduled asset at the time of the request. If the user has requested a different media asset, the processing device may automatically receive and provide the different media asset instead of the originally-scheduled asset.

22 Claims, 13 Drawing Sheets

SYSTEMS AND METHODS FOR PROVIDING A CUSTOMIZED PROGRAM LINEUP

CROSS-REFERENCE TO RELATED APPLICATION

This application is a continuation of prior U.S. patent application Ser. No. 13/528,144, filed Jun. 20, 2012. The prior application is hereby incorporated by reference herein in its entirety.

BACKGROUND OF THE INVENTION

Today's consumers are faced with an ever increasing number of media assets provided from a wide variety of content sources. Due to the large number of available choices, consumers may find it desirable to define a customized program lineup, thereby allowing the consumer to access media assets at the most convenient times and in a preferred order. To this end, traditional systems have long enabled consumers to time-shift media assets from their originally-scheduled broadcast times. For example, personal video recorders (PVRs), such as those provided by TIVO, Inc., record media assets onto a digital storage device and allow users to playback the media assets at a later time. PVRs may also record media assets in real-time, allowing users to pause real-time programs, rewind, and even fast forward through commercials until they reach a point at which the program is currently provided. However, PVRs are unable to adjust the original broadcast time of a media asset and thus are limited to providing playback after the original broadcast of the media asset. In particular, users are unable to view a media asset prior to its originally scheduled broadcast time.

SUMMARY OF THE INVENTION

Accordingly, systems and methods for delivering content according to a customized program lineup are provided. A content source may transmit a plurality of media assets according to scheduled transmission times. As used herein, "content source" may refer to any type of content distribution equipment, including a television distribution facility, a cable system headend, a cable service provider, a television channel, a video-on-demand (VOD) server, an Internet server, a website, a local recording device, a remote recording device, or any other suitable content provider. A user may define a customized program lineup by modifying the media assets from their originally-scheduled transmission times. In some embodiments, the user may navigate in an interactive program guide screen and select, swap, and reorder programs into a desired sequence. For example, the user may request a program which is originally scheduled to air at 10 pm to be received at 7 pm instead. In response to the user request, a processing device may update the program guide screen to display the customized program lineup as defined by the user. In some embodiments, the updated program guide screen is only generated for the requesting user, and other users in the media distribution network may still see the media assets at their originally-scheduled transmission times.

When the user requests access to a content source, the processing device may determine, based on the customized program lineup, whether the user has specified a different media asset than the originally-scheduled media asset at the time of the request. If the user has specified a different media asset according to the customized program lineup, the processing device may automatically receive the different media asset and provide it to the user instead of the originally-scheduled media asset. In some embodiments, the processing device may automatically transmit a request to the content source to provide the different media asset at the user-specified time. The processing device may subsequently receive and present the different media asset to the user instead of the originally-scheduled media asset.

In some embodiments, the processing device may automatically receive the different media asset from a second content source that is different than the original content source. For example, the processing device may receive the different media asset from an Internet streaming server which may provide the different media asset on-demand at the user-specified time. In some embodiments, the second content source may be associated with the original content source. For example, if the user shifted a media asset on ABC, the processing device may request the media asset from a streaming server or a website associated with the American Broadcasting Company. In other embodiments, the second content source may not be associated with the original content source. For example, the processing device may request the media asset from a third-party streaming server, such as YouTube, Netflix, or Hulu. The processing device may transmit a communication to the second content source requesting that the different media asset be made available at the time of the request. The processing device may automatically receive the media asset from the second content source and present it to the user instead of the originally-scheduled media asset.

After playback of a media asset completes, the processing device may determine whether the next media asset according to the customized program lineup is different than the originally-scheduled media asset to be transmitted by the content source. If the user has not specified a different media asset, the processing device may receive and present the originally-scheduled media asset. If the user has requested a different media asset according to the customized program lineup, the processing device may automatically receive and present the different media asset instead of the originally-scheduled media asset as described above. In this manner, the user may be seamlessly presented with requested media assets at specified times along with the originally-scheduled media assets when no special request has been made. At the same time, other users in the media distribution network may continue to receive the media assets from the content source at their originally-scheduled times.

In some embodiments, the request to access the content source may be received in the middle of a media asset according to the customized program lineup. For example, the user may have specified a media asset to air at 7 pm on ABC, but tuned to ABC at 7:15. In such embodiments, the processing device may transmit a request to the second content source to provide the media asset starting at an intermediate point corresponding to the time of the request. In the above example, the processing device may receive and present the media asset at a point fifteen minutes into the asset.

In some embodiments, each of the media assets may be associated with an availability window which indicates a combination of time intervals and/or content sources over which the media asset may be accessed. In some embodiments, the data indicating the availability window may be received with the program guidance data of the media asset. In alternate embodiments, the data indicating the availability windows may be received separately from the program guidance data. The availability window may extend prior to the originally-scheduled transmission time of the media asset, allowing a user to request early access to the media asset. The availability window may also extend past the originally-scheduled transmission time, allowing a user request the media asset at a later time. The availability window may also denote a single content source or a predetermined set of content sources over which a media asset may be accessed. For example, a program which is scheduled to broadcast on ABC may be shifted to other channels associated with the American Broadcasting Company, such as ABC Family.

In some embodiments, the processing device may store the personalized program lineup onto a digital storage device. The digital storage device may reside within a user equipment device, at a remote server, or a combination of the two. In some embodiments, the user may construct the personalized program lineup on a first user equipment device, such as a mobile phone, store the personalized program lineup at a remote server, and access the program lineup on a second user equipment device, such as a set-top-box.

In some embodiments, the processing device may automatically rearrange other media assets that are affected by the user request to shift a media asset. For example, the processing device may automatically shift the affected media assets forward or backward such that the requested media asset is "inserted" into the program lineup without a loss of programming. Furthermore, the processing device may determine whether related media assets should be rearranged into broadcast order. For example, if a later episode of a series is moved before an earlier episode of the same series, the processing device may automatically rearrange the episodes in their original broadcast order and update the customized program lineup.

In some embodiments, the creation of a customized program lineup may be associated with a fee. In some embodiments, the shifting of a media asset from its originally-scheduled transmission time and content source may be associated with a one-time fee. The processing device may request payment for the fee at any suitable time, such as at the time the media asset is shifted, when the media asset is delivered to the user equipment, or after the media asset is delivered. In alternate embodiments, the user may purchase a subscription which allows a limited or unlimited number of shifts within a certain content source or a predetermined set of content sources.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE VARIOUS EMBODIMENTS

Figure 1:
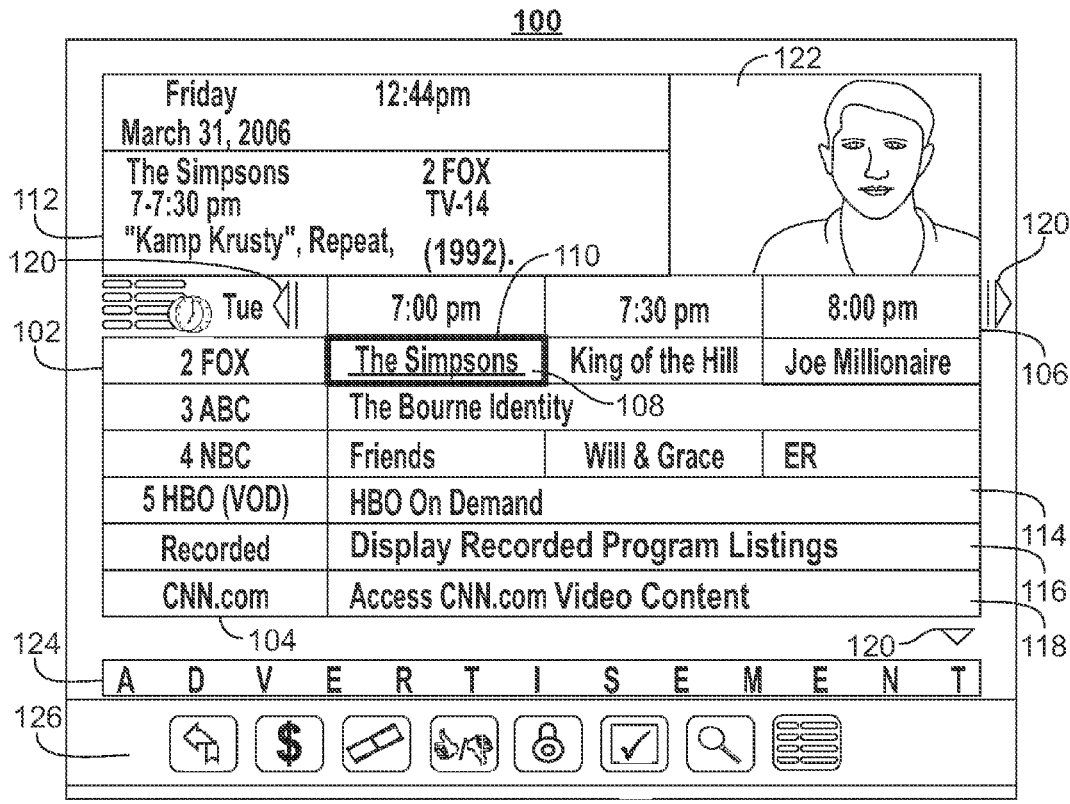
FIG. 1 shows an illustrative interactive media guidance application display screen in accordance with some embodiments of the present disclosure.

Systems and methods for delivering content according to a customized program lineup are provided. A content source transmits a plurality of media assets in a first schedule according to scheduled transmission times. A processing device may receive a user input to receive the media assets in a second schedule different from the first schedule. When a request to access the content source is received, the processing device may automatically determine, based on the second schedule, whether the user has requested a different media asset than the originally-scheduled asset at the time of the request. If the user has requested a different media asset, the processing device may automatically receive and provide the different media asset instead of the originally-scheduled asset.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate, and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections. Media guidance data may also include data indicating an availability window associated with a media asset, including an interval or intervals of time during which the media asset may be accessed as well as a predetermined set of content sources over which the media asset may be received. In some embodiments, data indicating the availability window for a media asset is communicated separately from the media guidance data.

Figure 2:
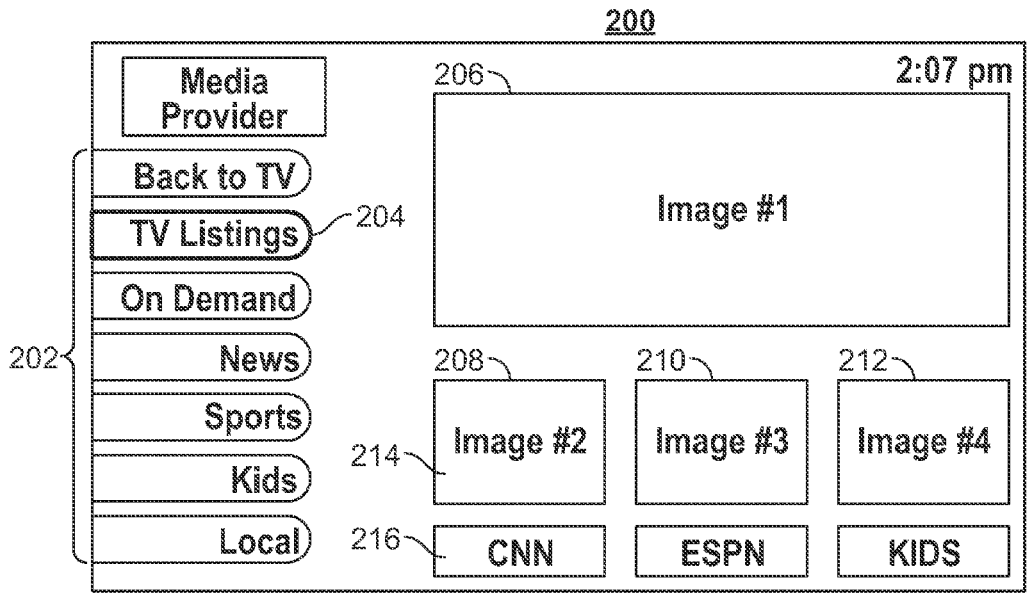
FIG. 2 shows another illustrative interactive media guidance application display screen in accordance with some embodiments of the present disclosure.

FIGS. 1-2 show illustrative display screens that may be used to provide media guidance data. The display screens shown in FIGS. 1-2 and 5-12 may be implemented on any suitable user equipment device or platform. While the displays of FIGS. 1-2 and 5-12 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrases "guidance application data" and "program guidance data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. As discussed below, the user may also request to view an availability window associated with a program, shift a program from its originally-scheduled transmission time, swap the transmission times of programs, or rearrange selected episodes into an original order, such as an original broadcast or episode order. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations. The customizations may also include defining a personalized program lineup by shifting selected media assets from their originally-scheduled transmission time and/or channel, as will be further discussed below.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
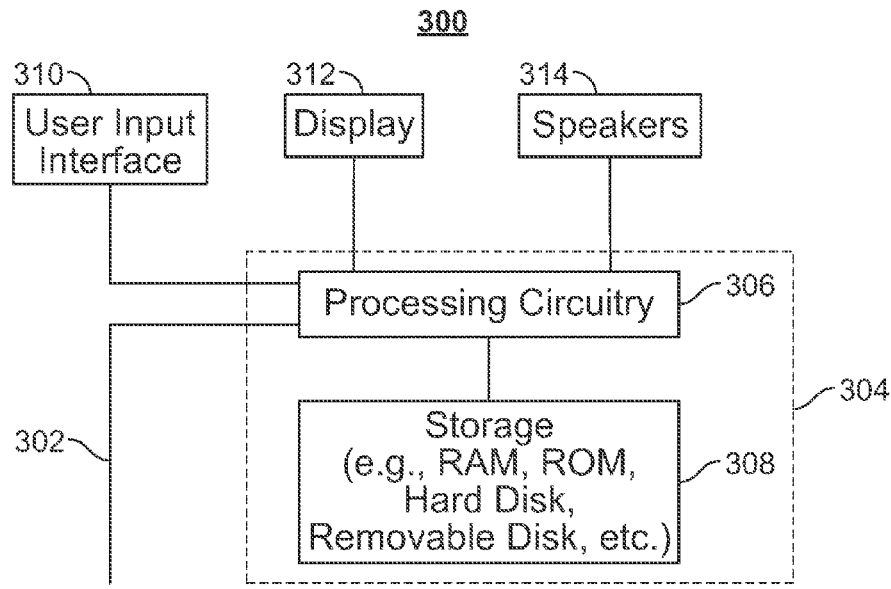
FIG. 3 illustrates an example of a user equipment device in accordance with some embodiments of the present disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
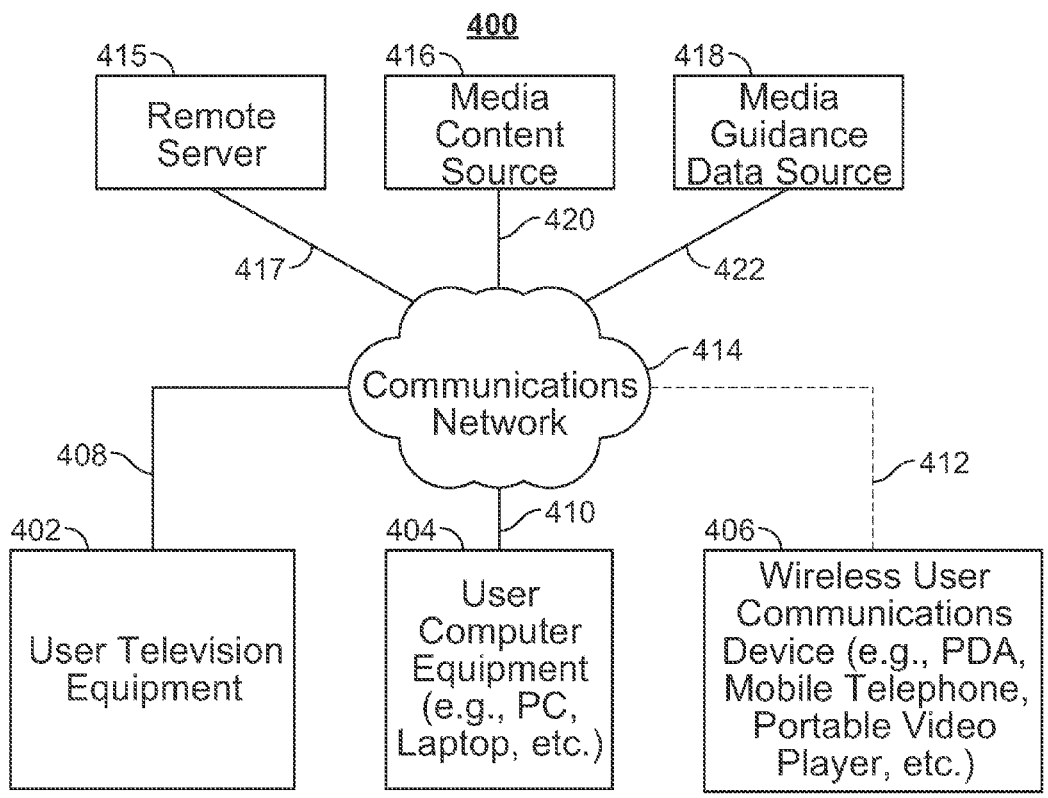
FIG. 4 illustrates an example of a cross-platform interactive media system in accordance with some embodiments of the present disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416, media guidance data source 418, and remote server 415 coupled to communications network 414 via communication paths 420, 422, and 417 respectively. Paths 420, 422, and 417 may include any of the communication paths described above in connection with paths 408, 410, and 412. Communications with the content source 416, media guidance data source 418, and remote server 415 may be exchanged over one or more communications paths, but are shown as a single path in FIG. 4 to avoid overcomplicating the drawing. In addition, there may be more than one of each of content source 416, media guidance data source 418, and remote server 415, but only one of each is shown in FIG. 4 to avoid overcomplicating the drawing. (The different types of each of these sources are discussed below.) If desired, content source 416 and media guidance data source 418 may be integrated as one source device. Although communications between sources 416, 418, and 415 with user equipment devices 402, 404, and 406 are shown as through communications network 414, in some embodiments, sources 416, 418, and 415 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the ABC, INC., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guidance data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct control circuitry to generate the guidance application displays and transmit the generated displays to the user equipment devices. The server application may instruct control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416, one or more media guidance data sources 418, and one or more remote servers 415. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server such as remote server 415.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content. In addition, a user may store a personalized program lineup on the cloud, such as at remote server 415, and access the personalized program lineup from any one of the user equipment devices 402, 404, or 406.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or, a user device can download content from multiple cloud resources for more efficient downloading. In some embodiments, user equipment devices can use cloud resources for processing operations such as the processing operations performed by processing circuitry described in relation to FIG. 3.

In some embodiments, media guidance system 400 may allow the user to create a customized program lineup. As used herein, "customized program lineup" and "personalized program lineup" refer to a sequence of media assets that has been modified from the originally-scheduled sequence of media assets. One or more media content sources 416 may transmit a plurality of media assets in a first sequence according to scheduled transmission times. A user equipment device, such as user television equipment 402, user computer equipment 404, or wireless user device 406, may receive program guidance data associated with each of the plurality of media assets from media guidance data source 418. Based on the program guidance data, control circuitry 304 may generate a program guide screen on display 312 which presents the plurality of media assets in the first sequence according to their scheduled transmission times, as discussed above in relation to FIGS. 1 and 2.

The program guidance data received from media guidance data source 418 may include information on the availability window associated with each of the plurality of media assets. In alternate embodiments, data indicating the availability windows may be received separately from the program guidance data, for example from media content source 416 or remote server 415.

The availability window associated with a media asset indicates a combination of time intervals and/or content sources over which the media asset may be accessed. For example, the availability window may be a single continuous interval of time on one content source, or several disjointed intervals of time distributed across many content sources. In some embodiments, the availability window may extend prior to the originally-scheduled transmission time associated with the media asset, allowing a user to request early access to the media asset. This may be possible for reruns of programs where, for example, a digital copy is available for streaming from media content source 416 or remote server 415. However, for live broadcasts or first showings of media assets, the media asset may be unavailable earlier than the originally scheduled transmission time. The availability window may also extend past the originally-scheduled transmission time of the media asset, allowing a user to delay transmission to a more convenient time. The media guidance data source 418 and/or user equipment 300 may store past program guidance data for a set amount of time, allowing a user to view past program listings and possibly shift missed programs to a future time for viewing.

The availability window may also denote a single content source or a predetermined set of content sources over which a media asset may be accessed. For convenience, the content sources may be referred to in the examples depicted herein as broadcast channels, but the content sources may also be non-broadcast-based content sources, such as an Internet server, VOD server, a content service provider, or other remote servers. In some embodiments, the availability window for a media asset may only allow the media asset to be shifted within a single content source. This may be desirable to a content provider, for example, to keep a program from being shifted to a competitor's channel. For similar reasons, the availability window may restrict an asset to a predetermined set of content sources. For example, a program which is scheduled to broadcast on ABC may be restricted to other channels associated with the American Broadcasting Company, such as ABC Family.

Users may navigate on the program guide screen, such as the display screens illustrated in FIGS. 1 and 2, using user input interface 310. The user may select a media asset, for example, by highlighting the asset using highlight indicator 110 and pressing a "select" or equivalent key on user input interface 310. Upon highlighting or selecting a media asset, control circuitry 304 may present the user with the availability window associated with the media asset, either through a separate availability window information screen as discussed below in relation to FIGS. 5-7 or by highlighting a region directly on grid 102 corresponding to the availability window, as discussed below in relation to FIG. 8.

Control circuitry 304 may receive a user request to shift a selected media asset to an alternate time and/or content source. In some embodiments, the user request may be a selection of an alternate time on grid 102 using highlight region 110. In other embodiments, the user may be presented with an option in options region 126 to input a time and content source to access the selected media asset. The specified time may occur on any suitable increment of time, such as a half-hour, hour, or other user-defined increment of time. For example, specifying times in half-hour increments may allow the user to easily swap programs and rearrange originally scheduled programming. Alternatively, the user may define a custom start time for a media asset such that it overlaps two or more scheduled media assets.

Upon receiving the user request, control circuitry 304 determines whether the requested time and content source falls within the availability window of the selected media asset. If the requested time or content source does not fall with the availability window, control circuitry 304 may optionally generate a notification to the user that the request cannot be processed. If the requested time and content source falls within the availability window, control circuitry 304 may determine whether the user has the necessary permissions to make the shift. For example, media content source 416 may charge a fee for providing the ability to create customized program lineups. In some cases, the shifting of a media asset from its originally-scheduled transmission time/content source may be associated with a one-time fee. Control circuitry 304 may prompt the user for payment at any suitable time, such as at the time a customized program lineup is created, at the time a user-requested media asset is delivered, or after a user-requested media asset is delivered. In alternate embodiments, the user may purchase a subscription which allows either a limited or an unlimited number of shifts within a predetermined set of content sources. For example, the user may subscribe to ABC's premium service, allowing the user to shift media assets across any of the channels associated with the American Broadcasting Company.

In some embodiments, control circuitry 304 may transmit the request to media content source 416 to determine whether the user has permission to shift the media asset. Media content source 416 may determine the user's subscription status and whether payment has been made or will be billed to the user in the future. Once the user's subscription status or payment information is verified, media content source 416 may transmit permissions data to user equipment 300 confirming that the user may make the requested shift. In some embodiments, the permissions data may be included in the user profile stored at the user equipment, remote server 415, media content source 416, or a combination of the above.

In some embodiments, the permissions data may include a list of one or more remote servers 415 that may provide the requested media asset at the requested time. For example, remote server 415 may comprise an Internet source which may stream the requested media asset to user equipment 300. In some embodiments, the permissions data may also include access rights to the list of remote servers 415. For example, the permissions data may include an access key which allows control circuitry 304 to access media content from remote server 415, whereas the media content might otherwise not be available to users without the access key.

Once control circuitry 304 has verified that the user has the necessary permissions to make the shift, control circuitry 304 may update the program guide screen with the selected media asset at the requested time and content source. In some embodiments, the program guide screen is updated only for the user who requested the personalized program lineup. The program guide screen for other users in the distribution network may still display the original media assets at their regularly scheduled transmission times.

In some embodiments, the selected media asset may replace the originally-scheduled media asset at the requested time such that the originally-scheduled media asset is "overwritten." In alternate embodiments, control circuitry 304 may swap the transmission times of the selected media asset and the originally-scheduled media asset. In such embodiments, control circuitry 304 may receive a user selection of a first media asset and a second media asset. Control circuitry 304 may determine whether the scheduled transmission time and content source associated with the second media asset falls within the availability window of the first media asset. If the scheduled transmission time and content source of the second media asset does not fall within the availability window of the first media asset, the processing device may generate a notification to the user that the request cannot be processed. If the scheduled transmission time and content source of the second media asset falls within the availability window of the first media asset, control circuitry 304 may update the program guide screen with the first media asset at the transmission time and content source of the second media asset. If the transmission time and content source of the first media asset also falls within the availability window associated with the second media asset, control circuitry 304 may further update the program guide screen with the second media asset at the transmission time and content source of the first media asset. In some embodiments, the program guide screen is updated only for the user who requested the personalized program lineup. The program guide screen for other users may display the original media assets at their regularly scheduled transmission times.

In some embodiments, control circuitry 304 may, in response to a user request to shift a media asset, rearrange the media assets that are affected by the user request. For example, control circuitry 304 may automatically shift the affected media assets forward or backward such that the requested media asset is "inserted" into the program lineup without a loss of programming. Furthermore, the processing device may determine whether related media assets should be rearranged into an original order, such as an original broadcast order or episode order. For example, if a later episode of a series is moved before an earlier episode of the same series, the processing device may query the user to rearrange the episodes in their original broadcast or episode order. Related media assets may be identified in any suitable manner. For example, related media assets may be identified by comparing program guidance data and matching program titles, series titles, episode numbers, or series IDs.

In some embodiments, media content source 416 or remote server 415 may provide media assets that may not be associated with a particular transmission time, such as VOD or Internet-delivered video. These media assets may be specifically designed to be streamed or otherwise available on demand at a user-requested time. Such assets may be integrated into the personalized program lineup along with scheduled media assets. In particular, these "on-demand" assets may be associated with availability windows which allow access at any time and on any content source.

Control circuitry 304 may store the personalized program lineup onto any suitable electronic storage device. The electronic storage device may reside within user equipment device 300, such as storage device 308, at a remote server 415, or a combination of the two. In embodiments where the personalized program lineup is stored at a remote server, the personalized program lineup may be synchronized across multiple user equipment devices using the cloud-based services as described above. For example, a user may construct a personalized program lineup on a first user equipment device, such as a mobile phone 406, store the personalized program lineup at a remote server 415, and access the program lineup on a second user equipment device, such as user television equipment 402. The various user equipment devices may be associated with any suitable interactive application for allowing the user to define a personalized program lineup, such as an interactive guidance application running on a set-top-box, a web browser accessed from a personal computer, a mobile application running on a mobile phone, or any other suitable user interface as will be appreciated by one skilled in the art.

In some embodiments, media guidance system 400 may deliver content according to a personalized program lineup to any one of user television equipment 402, user computer equipment 404, or wireless user communications device 406. Control circuitry 304 may receive a request to access media content source 416 and subsequently retrieve a personalized program lineup which has been stored on electronic storage device 308 or on a similar storage device at remote server 415. Based on the personalized program lineup, control circuitry 304 may determine, at the time of the request, whether the user has requested a different media asset than the originally scheduled media asset to be transmitted by media content source 416. If the user has not requested a different media asset, then control circuitry 304 may receive and playback the originally scheduled transmission from media content source 416. If the user has requested a different media asset, then control circuitry 304 may automatically receive the different media asset and provide it to the user instead of the originally-scheduled media asset. In some embodiments, control circuitry 304 may transmit a request to media content source 416 and receive the media asset directly from media content source 416 at the requested time. In other embodiments, media content source 416 may access an external server, such as remote server 415, to provide the media asset at the requested time. For example, remote server 415 may be a VOD server associated with media content source 416 capable of providing the different media asset on-demand at the requested time. In yet other embodiments, control circuitry 304 may receive the media asset directly from remote server 415. For example, remote server 415 may be a third-party Internet streaming server, such as those provided by YouTube, Netflix, or Hulu. In these embodiments, control circuitry 304 may need to access certain access rights for remote server 415, such as an access key, access code, or password provided by media content source 416.

In some embodiments, the request to access the content source may come in the middle of a media asset to be received according to the personalized program lineup. For example, the user may request an episode of "Modern Family" to air on ABC at 7 pm, but not tune to ABC until 7:15, halfway through the episode. In such embodiments, control circuitry 304 may access the personalized program lineup and determine the first media asset scheduled to be broadcast prior to the current time. If the media asset to be broadcast at the current time is a user-requested media asset, control circuitry 304 may transmit a request to media content source 416 or remote server 415 to provide the user-requested media asset starting at an intermediate point corresponding to the current time. In the example provided above, media content source 416 or remote server 415 would provide the episode of "Modern Family" starting 15 minutes into the episode.

After playback of the user-requested media asset completes, control circuitry 304 may access the personalized program lineup and automatically determine the next media asset scheduled to be received according to the personalized program lineup. If the next media asset to be received is a user-requested media asset, control circuitry 304 may automatically transmit a request to media content source 416 or remote server 415 to provide the different media asset and subsequently receive and playback the different media asset. In some embodiments, control circuitry 304 transmits the request prior to the completion of the previous media asset and buffers the next media asset in storage 308 in anticipation of playback. In this manner, media assets are automatically delivered to user equipment 300 according to the personalized program lineup without further user input, providing a seamless integration of requested assets at user-specified times and originally-scheduled media assets. At the same time, other users in the media distribution network, such as system 400, may continue to receive the media assets from the content source at their originally-scheduled times. In some embodiments, these other users may also define customized program lineups, allowing each user in media distribution network 400 to have a different program lineup and receive the media assets at times which are most convenient for them.

Figure 5:
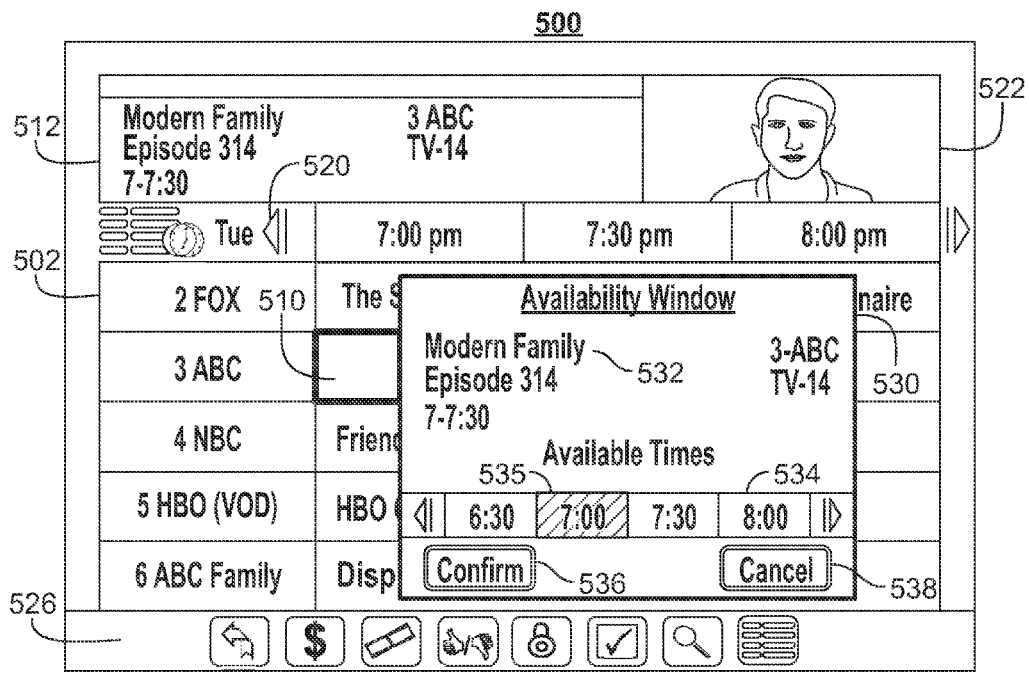
FIG. 5 shows an illustrative display screen presenting an availability window associated with a media asset in accordance with some embodiments of the present disclosure.

FIG. 5 shows an illustrative display screen 500 presenting an availability window associated with a media asset in accordance with some embodiments of the present disclosure. In this example, availability window information screen 530 is generated by control circuitry 304 as an overlay above an interactive media guidance application screen similar to the display screen shown in FIG. 1. In alternate embodiments, the availability window information screen 530 may also be overlaid over other interactive media guidance application screens, such as the one shown in FIG. 2, or over a media asset that is currently being viewed by the user. In still other embodiments, the availability window information screen 530 may be a separate full-screen display.

Similar to FIG. 1, display screen 500 consists of a program information region 512, a video region 522, a grid 502, and options region 526. Grid 502 may include rows indicating different channels or content sources and columns indicating a time block of programming. The time blocks may be given in any suitable time interval, such as half-hour increments. Each cell in the grid 502 may comprise a program listing, which provides the title of the program provided on the associated content source and time. The program listing may also include additional information, either within the cell or in program information region 512. The user may be able to scroll the grid 502 to see future or past listings using user input interface 310, either by moving highlight region 510 or by selecting a dedicated scroll indicator, such as indicator 520. Electronic storage 308 may store past media guidance information for a set period of time, and a user request to scroll beyond this period of time may result in the user equipment 300 transmitting a request to media guidance data source 418 and receiving further media guidance information for the requested period of time.

Information related to the program listing highlighted by highlight region 510 may be provided in program information region 512. Region 512 may include, for example, the program title, the program description, the time the program is provided, the channel or content source the program is on, the program's rating, a series name, or an episode number. The region 512 may also include a brief description of the availability window of the highlighted media asset, such as a time interval and set of content sources over which the asset may be received.

Video region 522 may allow the user to view and/or preview programs that are currently available, will be available, or were available to the user. The content of video region 522 may correspond to, or be independent from, one of the listings displayed in grid 502. For example, the video region 522 may provide a live feed, a preview, or an advertisement associated with the program listing which is currently highlighted by highlight region 510. The video and audio of the content may continue even when the availability window information screen 530 is overlaid on display 500 to provide an uninterrupted experience to the user. In embodiments where the availability window information screen is a full-screen display, the audio of the content in video region 522 may continue.

Options region 526 may be part of the display 500, or may be invoked by the user by selecting an on-screen option or pressing a dedicated or assignable button on user input interface 310. For example, the user may be allowed to select a program listing by highlighting a listing with highlight region 510 and pressing an "enter", "select", or another dedicated or assignable key on the user input interface 310. Selecting a listing may highlight the listing in a different shade, color, or otherwise visually distinguish the listing from unselected listings. In response to a user highlighting or selecting a listing, control circuitry 304 may generate options in options region 526 concerning the highlighted or selected listing, including viewing additional program information, searching for other transmission times or ways of receiving the program, searching for related programs, setting a program and/or channel as a favorite, purchasing a program, invoking availability window information screen 530, shifting a program from its originally-scheduled transmission time and/or content source, or swapping the transmission times and content sources of two programs. In some embodiments, the user may be able to select multiple listings, either by manually selecting individual listings or by selecting a range of listings between two selected listings. In response to the user selecting multiple listings, control circuitry 304 may generate additional options in options region 526 concerning the selected listings. For instance, if the selected listings include listings associated with related media assets, such as episodes of the same series, the options region 526 may include an option to rearrange the episodes into broadcast or series order.

Availability window information screen 530 may be generated by control circuitry 304 in response to a user request to view an availability window associated with a media asset. In some embodiments, control circuitry 304 may detect a user highlighting or selecting a listing in grid 520 and in response, display availability window information screen 530. In other embodiments, the user may invoke availability window information screen 530 by highlighting a listing with highlight region 510 and pressing a dedicated or assignable button on user input interface 310. Control circuitry 304 may also generate the availability window information screen 530 while the user is currently watching a media asset. In other embodiments, the user may invoke availability window information screen 530 by selecting an option in options region 526. In yet other embodiments, the availability window information screen 530 may be automatically invoked without an explicit user request. For example, control circuitry 304 may detect a missed favorite program, a missed reminder, or other detectable event and in response, prompt the user with availability window information screen 530.

Availability window information screen 530 may include a program information region 532, an available time indicator 534, a time selector 535, a confirmation button 536, and a cancel button 538. Program information region 532 may provide similar information as program information region 512, such as title, series name, episode name, originally-scheduled transmission time, original channel or content source, parental rating, and popularity rating. In some embodiments, region 532 may additionally provide more detailed information, such as program descriptions, episode summaries, and reviews. In the example depicted in FIG. 5, the user has selected episode number 314 of the series "Modern Family" which has an originally-scheduled transmission time of 7 pm.

The available time indicator 534 may indicate the interval or intervals of time during which the media asset may be accessed, as defined by the availability window. As discussed above, data regarding the availability window may be received by control circuitry 304 either together with media guidance data from media guidance data source 418, or separately from the media guidance data from media guidance data source 418 or remote server 415. The available time indicator 534 may display the available times in any suitable manner and in any suitable increments, including as a timeline, a range of values, selectable buttons, slide bar, or other interactive graphical element as will be appreciated by one skilled in the art. Furthermore, the available time indicator 534 may show interactive graphical elements corresponding only to the available times as defined by the availability window of the media asset. Alternatively, the time indicator 534 may display interactive graphical elements for all time slots, with elements corresponding to unavailable times shaded in grey or otherwise distinguished from available times.

In the example depicted in FIG. 5, the available time indicator 534 is displayed as a scroll bar with thirty minute increments. Time selector 535 is an interactive graphical element which highlights the currently selected time and may be moved by the user with user input interface 310. When the availability window information screen 530 is first invoked, control circuitry 304 may initially highlight the originally-scheduled transmission time of the media asset as the default time using the time selector 535, as shown in FIG. 5. Alternatively, control circuitry 304 may also highlight the current time, or any other user-specified time, as the default time regardless of the originally-scheduled transmission time of the media asset. The time selector 535 may move in discrete time intervals, such as in thirty minute intervals, or may move in a continuous manner, allowing the user to specify a custom start time.

Once the user has selected a desired transmission time using time selector 535, the user may confirm his choice using the confirmation button 536 or cancel his choice using cancel button 538. Control circuitry 304 may subsequently determine whether a confirmed choice indicates a requested time which is within the availability window of the media asset. If the requested time is within the availability window, control circuitry 304 may update the grid 502 to reflect the media asset at the requested time. In some embodiments, the grid 500 is updated only for the user who requested the personalized program lineup. The program guide screen for other users in the distribution network may display the original media assets at their regularly scheduled transmission times.

Figure 6:
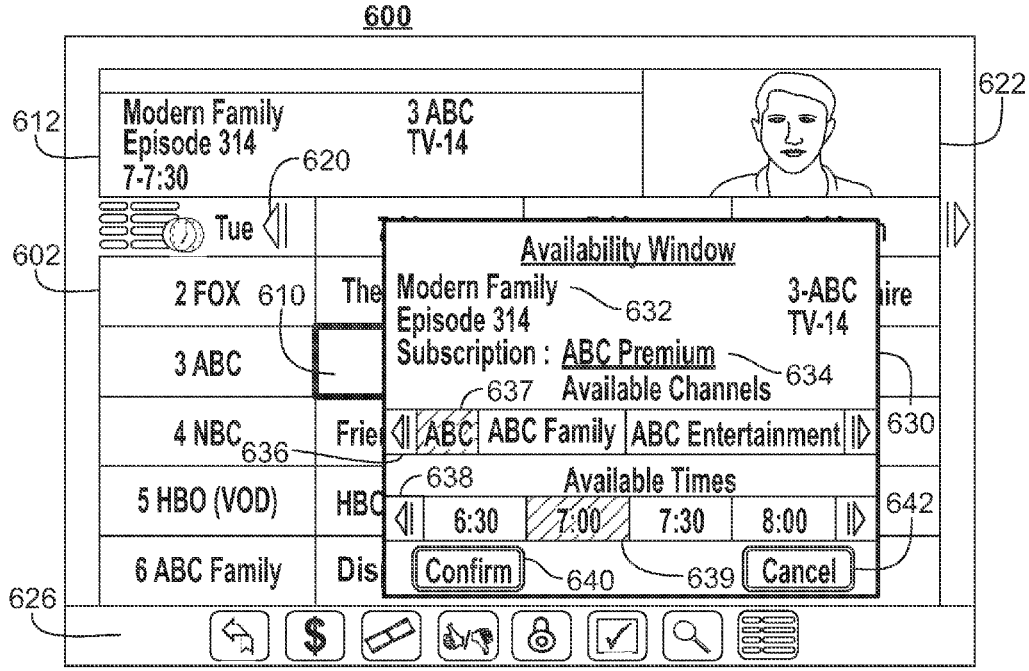
FIG. 6 shows another illustrative display screen presenting an availability window associated with a media asset in accordance with some embodiments of the present disclosure.

FIG. 6 shows another illustrative display screen 600 presenting an availability window associated with a media asset in accordance with some embodiments of the present disclosure. In this example, availability window information screen 630 is generated by control circuitry 304 as an overlay above an interactive media guidance application screen similar to the display screen shown in FIG. 1. In alternate embodiments, the availability window information screen 630 may also be overlaid over other interactive media guidance application screens, such as the one shown in FIG. 2, or over a media asset that is currently being viewed by the user. In still other embodiments, the availability window information screen 630 may be a separate full-screen display.

Similar to FIG. 1, display screen 600 consists of a program information region 612, a video region 622, a grid 602, and options region 626. Grid 602 may include rows indicating different channels or content sources and columns indicating a time block of programming. The time blocks may be given in any suitable time interval, such as half-hour increments. Each cell in the grid 602 may comprise a program listing, which provides the title of the program provided on the associated content source and time. The program listing may also include additional information, either within the cell or in program information region 612. The user may be able to scroll the grid 602 to see future or past listings using user input interface 310, either by moving highlight region 610 or by selecting a dedicated scroll indicator, such as indicator 620. Electronic storage 308 may store past media guidance information for a set period of time, and a user request to scroll beyond this period of time may result in the user equipment 300 transmitting a request to media guidance data source 418 and receiving further media guidance information for the requested period of time.

Information related to the program listing highlighted by highlight region 610 may be provided in program information region 612. Region 612 may include, for example, the program title, the program description, the time the program is provided, the channel or content source the program is on, the program's rating, a series name, or an episode number. The region 612 may also include a brief description of the availability window of the highlighted media asset, such as a time interval and set of content sources over which the asset may be received.

Video region 622 may allow the user to view and/or preview programs that are currently available, will be available, or were available to the user. The content of video region 622 may correspond to, or be independent from, one of the listings displayed in grid 602. For example, the video region 622 may provide a live feed, a preview, or an advertisement associated with the program listing which is currently highlighted by highlight region 610. The video and audio of the content may continue even when the availability window information screen 630 is overlaid on display 600 to provide an uninterrupted experience to the user. In embodiments where the availability window information screen 630 is a full-screen display, the audio of the content in video region 622 may continue.

Options region 626 may be part of the display 600, or may be invoked by the user by selecting an on-screen option or pressing a dedicated or assignable button on user input interface 310. For example, the user may be allowed to select a program listing by highlighting a listing with highlight region 610 and pressing an "enter", "select", or another dedicated or assignable key on the user input interface 310. Selecting a listing may highlight the listing in a different shade, color, or otherwise visually distinguish the listing from unselected listings. In response to a user highlighting or selecting a listing, control circuitry 304 may generate options in options region 626 concerning the highlighted or selected listing, including viewing additional program information, searching for other transmission times or ways of receiving the program, searching for related programs, setting a program and/or channel as a favorite, purchasing a program, invoking availability window information screen 630, shifting a program from its originally-scheduled transmission time and/or content source, or swapping the transmission times and content sources of two programs. In some embodiments, the user may be able to select multiple listings, either by manually selecting individual listings or by selecting a range of listings between two selected listings. In response to the user selecting multiple listings, control circuitry 304 may generate additional options in options region 626 concerning the selected listings. For instance, if the selected listings include listings associated with related media assets, such as episodes of the same series, the options region 626 may include an option to rearrange the episodes into broadcast or series order.

Availability window information screen 630 may be generated by control circuitry 304 in response to a user request to view an availability window associated with a media asset. In some embodiments, control circuitry 304 may detect a user highlighting or selecting a listing in grid 620 and in response, display availability window information screen 630. In other embodiments, the user may invoke availability window information screen 630 by highlighting a listing with highlight region 610 and pressing a dedicated or assignable button on user input interface 310. Control circuitry 304 may also generate the availability window information screen 630 while the user is currently watching a media asset. In other embodiments, the user may invoke availability window information screen 630 by selecting an option in options region 626. In yet other embodiments, the availability window information screen 630 may be automatically invoked without an explicit user request. For example, control circuitry 304 may detect a missed favorite program, a missed reminder, or other detectable event and in response, prompt the user with availability window information screen 630.

Availability window information screen 630 may include a program information region 632, a subscription indicator 634, an available content source indicator 636, a content source selector 637, an available time indicator 638, a time selector 639, a confirmation button 640, and a cancel button 642. Program information region 632 may provide similar information as program information region 612, such as title, series name, episode name, originally-scheduled transmission time, original channel or content source, parental rating, and popularity rating. In some embodiments, region 632 may additionally provide more detailed information, such as program descriptions, episode summaries, and reviews. In the example depicted in FIG. 6, the user has selected episode number 314 of the series "Modern Family" which has an originally-scheduled transmission time of 7 pm.

The subscription indicator 634 may indicate a current subscription associated with the user. Control circuitry 304 may retrieve subscription information from a user profile stored in storage 308, at remote server 415, or a combination of the two. In some embodiments, control circuitry 304 may query the media content source 416 or remote server 415 to provide subscription information associated with the user. The subscription information may include permissions and fees associated with shifting media assets within a predetermined set of channels or content sources. In the example depicted in FIG. 6, the user has subscribed to a premium account associated with ABC, thus allowing the user to shift media assets to any channel associated with the American Broadcasting Company.

The available content source indicator 636 may indicate the content sources within which the media asset may be shifted, as defined by the availability window. The available content source indicator 636 may display the available content sources in any suitable manner, including as a scroll bar, selectable buttons, or other interactive graphical element as will be appreciated by one skilled in the art. The set of available channels or content sources may be determined by control circuitry 304 from the availability window associated with the media asset. Control circuitry 304 may further determine from retrieved subscription information associated with the user whether the user has the required permissions associated with the available content sources. If not, control circuitry 304 may display the available content sources as greyed out or otherwise distinguished from content sources to which the user has permission to shift the media asset.

Content source selector 637 is an interactive graphical element which highlights the currently selected content source and may be moved by the user with user input interface 310. When the availability window information screen 630 is first invoked, control circuitry 304 may initially highlight the original content source of the media asset as the default content source using the content source selector 637, as shown in FIG. 6.

The available time indicator 638 may indicate the interval or intervals of time during which the media asset may be accessed, as defined by the availability window. As discussed above, data regarding the availability window may be received by control circuitry 304 either together with media guidance data from media guidance data source 418, or separately from the media guidance data from media guidance data source 418 or remote server 415. The available time indicator 638 may display the available times in any suitable manner and in any suitable increments, including as a timeline, a range of values, selectable buttons, slide bar, or other interactive graphical element as will be appreciated by one skilled in the art. Furthermore, the available time indicator 638 may show interactive graphical elements corresponding only to the available times as defined by the availability window of the media asset. Alternatively, the time indicator 638 may display interactive graphical elements for all time slots, with elements corresponding to unavailable times shaded in grey or otherwise distinguished from available times.

In the example depicted in FIG. 6, the available time indicator 638 is displayed as a scroll bar with thirty minute increments. Time selector 639 is an interactive graphical element which highlights the currently selected time and may be moved by the user with user input interface 310. When the availability window information screen 630 is first invoked, control circuitry 304 may initially highlight the originally-scheduled transmission time of the media asset as the default time using the time selector 639, as shown in FIG. 6. Alternatively, control circuitry 304 may also highlight the current time, or any other user-specified time, as the default time regardless of the originally-scheduled transmission time of the media asset. The time selector 639 may move in discrete time intervals, such as in thirty minute intervals, or may move in a continuous manner, allowing the user to specify a custom start time.

Once the user has selected a desired transmission time and content source using time selector 639 and content source selector 637, the user may confirm his choice using the confirmation button 640 or cancel his choice using cancel button 642. Control circuitry 304 may subsequently determine whether a confirmed choice indicates a requested time and content source which is within the availability window of the media asset. If the requested time and content source is within the availability window, control circuitry 304 may update the grid 602 to reflect the media asset at the requested time and content source. In some embodiments, the program guide screen is updated only for the user who requested the personalized program lineup. The program guide screen for other users in the distribution network may display the original media assets at their regularly scheduled transmission times.

Figure 7:
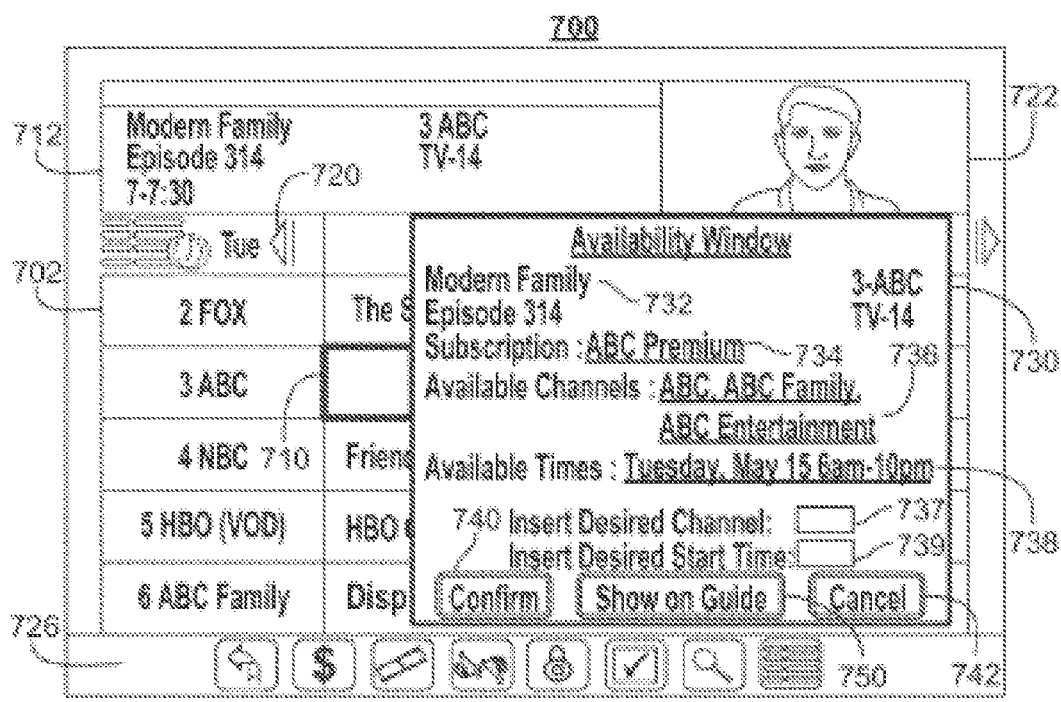
FIG. 7 shows another illustrative display screen presenting an availability window associated with a media asset in accordance with some embodiments of the present disclosure.

FIG. 7 shows another illustrative display screen 700 presenting an availability window associated with a media asset in accordance with some embodiments of the present disclosure. In this example, availability window information screen 730 is generated by control circuitry 304 as an overlay above an interactive media guidance application screen similar to the display screen shown in FIG. 1. In alternate embodiments, the availability window information screen 730 may also be overlaid over other interactive media guidance application screens, such as the one shown in FIG. 2, or over a media asset that is currently being viewed by the user. In still other embodiments, the availability window information screen 730 may be a separate full-screen display.

Similar to FIG. 1, display screen 700 consists of a program information region 712, a video region 722, a grid 702, and options region 726. Grid 702 may include rows indicating different channels or content sources and columns indicating a time block of programming. The time blocks may be given in any suitable time interval, such as half-hour increments. Each cell in the grid 702 may comprise a program listing, which provides the title of the program provided on the associated content source and time. The program listing may also include additional information, either within the cell or in program information region 712. The user may be able to scroll the grid 702 to see future or past listings using user input interface 310, either by moving highlight region 710 or by selecting a dedicated scroll indicator, such as indicator 720. Electronic storage 308 may store past media guidance information for a set period of time, and a user request to scroll beyond this period of time may result in the user equipment 300 transmitting a request to media guidance data source 418 and receiving further media guidance information for the requested period of time.

Information related to the program listing highlighted by highlight region 710 may be provided in program information region 712. Region 712 may include, for example, the program title, the program description, the time the program is provided, the channel or content source the program is on, the program's rating, a series name, or an episode number. The region 712 may also include a brief description of the availability window of the highlighted media asset, such as a time interval and set of content sources over which the asset may be received.

Video region 722 may allow the user to view and/or preview programs that are currently available, will be available, or were available to the user. The content of video region 722 may correspond to, or be independent from, one of the listings displayed in grid 702. For example, the video region 722 may provide a live feed, a preview, or an advertisement associated with the program listing which is currently highlighted by highlight region 710. The video and audio of the content may continue even when the availability window information screen 730 is overlaid on display 700 to provide an uninterrupted experience to the user. In embodiments where the availability window information screen 730 is a full-screen display, the audio of the content in video region 722 may continue.

Options region 726 may be part of the display 700, or may be invoked by the user by selecting an on-screen option or pressing a dedicated or assignable button on user input interface 310. For example, the user may be allowed to select a program listing by highlighting a listing with highlight region 710 and pressing an "enter", "select", or another dedicated or assignable key on the user input interface 310. Selecting a listing may highlight the listing in a different shade, color, or otherwise visually distinguish the listing from unselected listings. In response to a user highlighting or selecting a listing, control circuitry 304 may generate options in options region 726 concerning the highlighted or selected listing, including viewing additional program information, searching for other transmission times or ways of receiving the program, searching for related programs, setting a program and/ or channel as a favorite, purchasing a program, invoking availability window information screen 730, shifting a program from its originally-scheduled transmission time and/or content source, or swapping the transmission times and content sources of two programs. In some embodiments, the user may be able to select multiple listings, either by manually selecting individual listings or by selecting a range of listings between two selected listings. In response to the user selecting multiple listings, control circuitry 304 may generate additional options in options region 726 concerning the selected listings. For instance, if the selected listings include listings associated with related media assets, such as episodes of the same series, the options region 726 may include an option to rearrange the episodes into broadcast or series order.

Availability window information screen 730 may be generated by control circuitry 304 in response to a user request to view an availability window associated with a media asset. In some embodiments, control circuitry 304 may detect a user highlighting or selecting a listing in grid 720 and in response, display availability window information screen 730. In other embodiments, the user may invoke availability window information screen 730 by highlighting a listing with highlight region 710 and pressing a dedicated or assignable button on user input interface 310. Control circuitry 304 may also generate the availability window information screen 730 while the user is currently watching a media asset. In other embodiments, the user may invoke availability window information screen 730 by selecting an option in options region 726. In yet other embodiments, the availability window information screen 730 may be automatically invoked without an explicit user request. For example, control circuitry 304 may detect a missed favorite program, a missed reminder, or other detectable event and in response, prompt the user with availability window information screen 730.

Availability window information screen 730 may include a program information region 732, a subscription indicator 734, an available content source indicator 736, a content source selector 737, an available time indicator 738, a time selector 739, a confirmation button 740, a cancel button 742, and a "Show on Guide" button 750. Program information region 732 may provide similar information as program information region 712, such as title, series name, episode name, originally-scheduled transmission time, original channel or content source, parental rating, and popularity rating. In some embodiments, region 732 may additionally provide more detailed information, such as program descriptions, episode summaries, and reviews. In the example depicted in FIG. 7, the user has selected episode number 314 of the series "Modern Family" which has an originally-scheduled transmission time of 7 pm.

The subscription indicator 734 may indicate a current subscription associated with the user. Control circuitry 304 may retrieve subscription information from a user profile stored in storage 308, at remote server 415, or a combination of the two. In some embodiments, control circuitry 304 may query the media content source 416 or remote server 415 to provide subscription information associated with the user. The subscription information may include permissions and fees associated with shifting media assets within a predetermined set of channels or content sources. In the example depicted in FIG. 7, the user has subscribed to a premium account associated with ABC, thus allowing the user to shift media assets to any channel associated with the American Broadcasting Company.

The available content source indicator 736 may indicate the content sources within which the media asset may be shifted, as defined by the availability window. FIG. 7 depicts the content source indicator 736 as a delimited list of available content sources, but the available content source indicator 736 may display the available content sources in any suitable manner, including as, a scroll bar, selectable buttons, or other interactive graphical element as will be appreciated by one skilled in the art. The set of available channels or content sources may be determined by control circuitry 304 from the availability window associated with the media asset. Control circuitry 304 may further determine from retrieved subscription information associated with the user whether the user has the required permissions associated with the available content sources. If not, control circuitry 304 may omit the content sources from display which are not permitted, display these content sources as greyed out, or otherwise distinguish these content sources from content sources to which the user has permission to shift the media asset.

Content source selector 737 is an interactive graphical element which allows the user to select a channel or content source. In some embodiments, selecting content source selector 737 using user input interface 310 results in displaying an interactive list of the available content sources, populated from the available content source indicator 736. In other embodiments, each of the content sources listed in the available content source indicator 736 may comprise an interactive link that, when selected by the user, is displayed in content source selector 737. Other methods for receiving a user request for a content source may be used as will be apparent to one skilled in the art.

The available time indicator 738 may indicate the interval or intervals of time during which the media asset may be accessed, as defined by the availability window. As discussed above, data regarding the availability window may be received by control circuitry 304 either together with media guidance data from media guidance data source 418, or separately from the media guidance data from media guidance data source 418 or remote server 415. In the example of FIG. 7, the available time indicator 738 presents the available times during which the media asset may be accessed for the current date. The available time indicator 738 may also comprise selectable links which allow the user to select a different date and view the available times for the media asset for that date.

Time selector 739 is an interactive graphical element which allows the user to input a desired start time for the media asset. In some embodiments, the user may input a time manually using numeric keys on user input interface 310. In other embodiments, selecting the time selector 739, for instance by pressing an "enter" or "select" key on the user input interface 310, causes control circuitry 304 to generate a list of available times at predetermined increments selectable by the user. Other methods for receiving a user request for a desired start time may be used as will be apparent to one skilled in the art.

Once the user has selected a desired transmission time and content source using time selector 739 and content source selector 737, the user may confirm his choice using the confirmation button 740 or cancel his choice using cancel button 742. Control circuitry 304 may subsequently determine whether a confirmed choice indicates a requested time and content source which is within the availability window of the media asset. If the requested time and content source is within the availability window, control circuitry 304 may update the grid 702 to reflect the media asset at the requested time and content source. In some embodiments, the program guide screen is updated only for the user who requested the personalized program lineup. The program guide screen for other users in the distribution network may display the original media assets at their regularly scheduled transmission times.

Figure 8A:
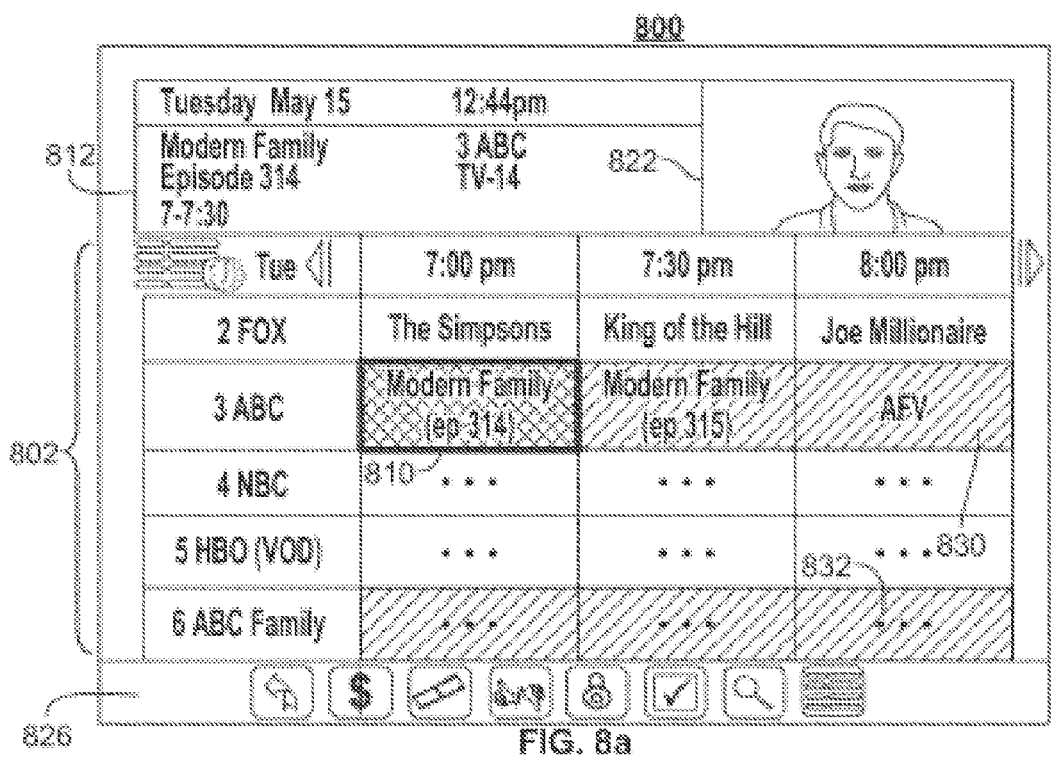
FIG. 8a shows an illustrative interactive media guidance application display screen with a first sequence of media assets in accordance with some embodiments of the present disclosure.

FIG. 8a shows an illustrative interactive media guidance application display screen 800 with a first sequence of media assets in accordance with some embodiments of the present disclosure. Similar to FIG. 1, display screen 800 includes a program information region 812, a video region 822, a grid 802, highlight region 810, and an options region 826, which are substantially similar to program information region 112, video region 122, grid 102, highlight region 110, and options region 126. Display screen 800 may be displayed in response to a user request to view an availability window associated with a highlighted or selected media asset. For example, a user may highlight a program listing with highlight region 810 and press a dedicated or assignable button on user input interface 310 to view additional information regarding the media asset. In response, control circuitry 304 may highlight regions 830 and 832 on grid 802 to display the availability window associated with the currently highlighted or selected media asset. Alternatively, the user may select an option in options region 826 to view the availability window. In the example depicted in FIG. 8, the availability window associated with episode 314 of "Modern Family" is highlighted across separate channels with highlight region 830 and 832.

The display screen 800 may also be invoked by pressing the "Show on Guide" button 750 depicted in FIG. 7. A similar button may also be integrated into the availability window information screens 530 and 630 depicted in FIGS. 5 and 6, and any variants thereof. In some embodiments, the "Show on Guide" button 750 may be pressed after the user has input a desired content source and start time in content source selector 737 and time selector 739. In response, control circuitry may highlight the availability window associated with the media asset, as shown by highlight regions 830 and 832, and additionally distinguish the user-requested time-block. For example, the user's selection may be highlighted in a different color from the rest of the availability window, providing the user with a visual representation of the requested time and content source.

The display screen 800 may also allow the user to select a media asset and "drag and drop" the media asset to an alternate time and/or content source within the availability window of the media asset. For example, the user may select episode 314 of "Modern Family" airing at 7 pm, scroll to the 8 pm time block, and "drop" the episode at the new time block by selecting the new time block. Alternatively, the user may define a new time for the episode using any one of the availability window information screens 530, 630, or 730.

Figure 8B:
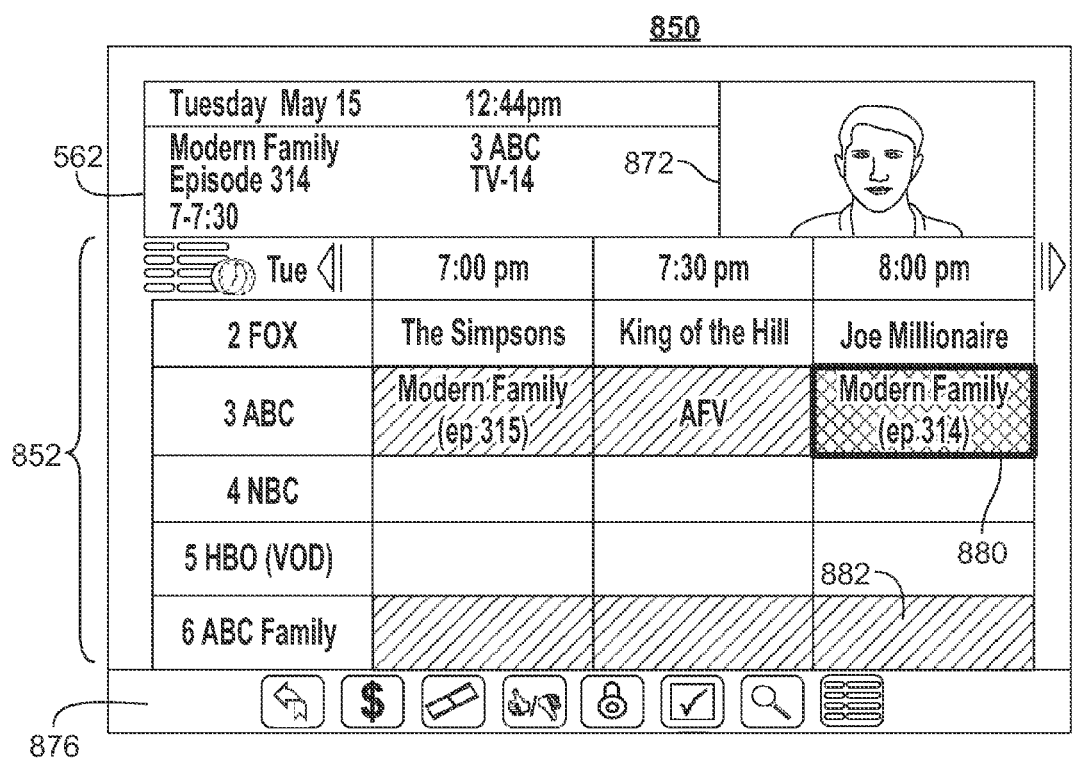
FIG. 8b shows an illustrative interactive media guidance application display screen with a second sequence of media assets in accordance with some embodiments of the present disclosure.

In response to the user request to shift the episode to a new time, control circuitry 304 may determine whether the user requested time and content source fall within the availability window associated with the media asset. Upon confirming that the new time and content source are within the availability window, control circuitry 304 may update the grid 802 to display the media asset at the requested time and content source. FIG. 8b shows an illustrative interactive media guidance application display screen with a second sequence of media assets in accordance with some embodiments of the present disclosure. In the example depicted in FIG. 8b, episode 314 of "Modern Family" has been moved to the 8 pm timeslot. In some embodiments, control circuitry 304 may optionally shift the other media assets forward such that the requested media asset is "inserted" into the program lineup without a loss of programming. In FIG. 8b, episode 315 of "Modern Family" has been shifted from 7:30 pm to 7 pm and "AFV" has been shifted from 8 pm to 7:30 pm, thereby allowing episode 314 of "Modern Family" to be inserted at the 8 pm timeslot without a loss of programming. In alternative embodiments, the requested media asset may replace the originally-scheduled media asset at the requested time. For example, episode 314 of "Modern Family" may be broadcast at both the 7 pm and the 8 pm timeslots, overwriting "AFV" at 8 pm. In still other embodiments, control circuitry 304 may swap the two media assets, such that episode 314 of "Modern Family" is transmitted at 8 pm and "AFV" is transmitted at 7 pm.

Figure 9:
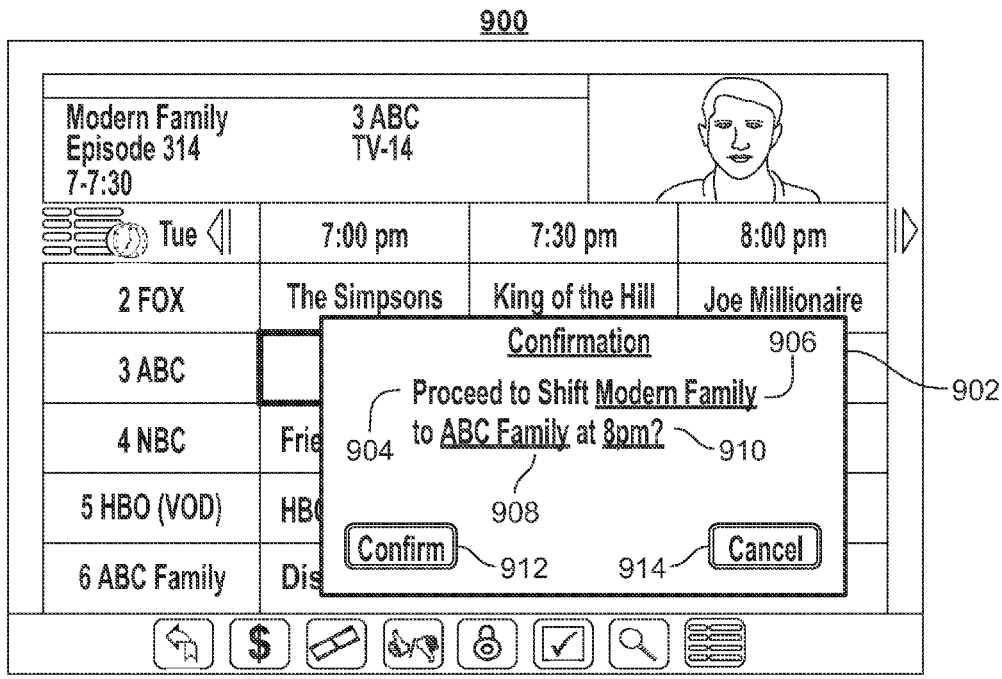
FIG. 9 shows an illustrative confirmation display screen in accordance with some embodiments of the present disclosure.

FIG. 9 shows an illustrative confirmation display screen 900 to shift a media asset in accordance with some embodiments of the present disclosure. Confirmation screen 902 may be generated by control circuitry 304 in response to a user request to shift a media asset to a new time and/or content source. For example, control circuitry 304 may present the user with confirmation screen 902 after the user has input a requested time and/or content source into one of availability window information screens 530, 630, or 730 and selected confirmation button 536, 640, or 740. Alternatively, confirmation screen 902 may be generated when the user selects an alternate time and/or content source using the "drag and drop" feature as discussed above in relation to FIGS. 8a and 8b. In the example depicted in FIG. 9, the confirmation screen 902 is generated by control circuitry 304 as an overlay above an interactive media guidance application screen similar to the display screen shown in FIG. 1. In alternate embodiments, the confirmation screen 902 may be overlaid over other interactive media guidance application screens, such as the one shown in FIG. 2, or over a media asset that is currently being viewed by the user. In still other embodiments, the confirmation screen 902 may be a separate full-screen display.

Confirmation screen 902 may include confirmation statement 904, confirmation button 912, and cancel button 914. The confirmation statement 904 may include a media asset identifier field 906, a content source field 908, and time identifier field 910. The fields 906, 908, and 910 may be populated with the user's selections from one of the availability window information screens 530, 630, or 730 or alternatively from the user's "drag and drop" selection on grid 802. The user may confirm the shift by selecting the confirm button 912 or cancel his choice by selecting the cancel button 914. In response to a user selection of the confirm button 912, control circuitry 304 may determine whether the user-requested time and content source fall within the availability window of the media asset. If the user-requested time does not fall within the availability window of the media asset, control circuitry 304 may generate a notification to the user indicating that the requested move could not be completed. If the user-requested time falls within the availability window of the media asset, control circuitry 304 may update the program guide screen to display the media asset at the requested time and content source. In response to a user selection of the cancel button 914, control circuitry 304 may return the user back to one of the availability window information screens 530, 630, or 730, the display screen 800, or the display screen 100.

Figure 10:
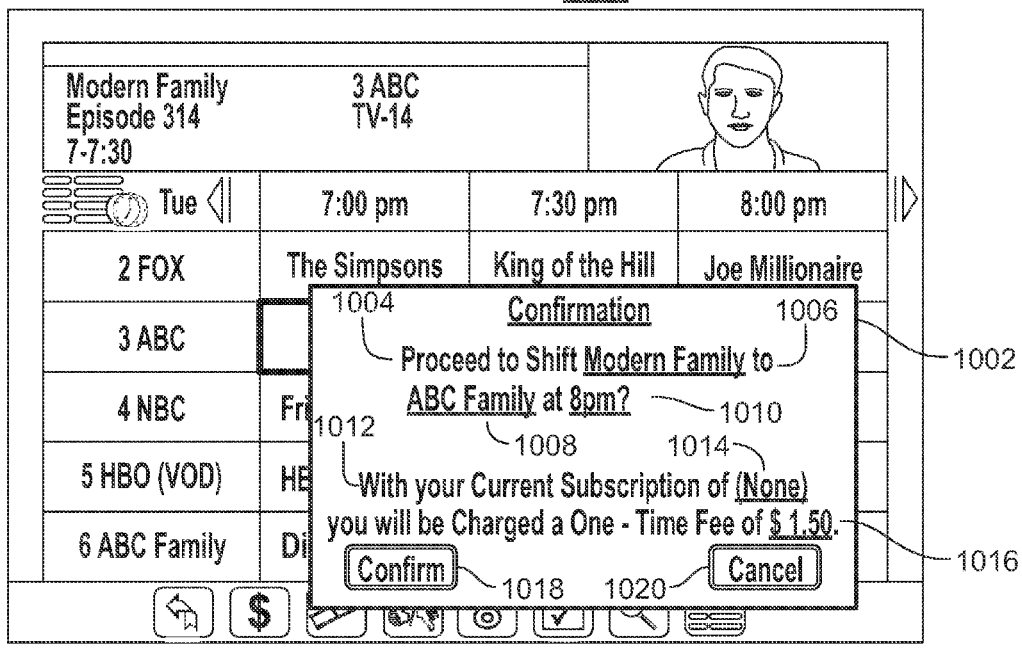
FIG. 10 shows an illustrative confirmation display screen with subscription and fee information in accordance with some embodiments of the present disclosure.

FIG. 10 shows an illustrative confirmation display screen 1000 with subscription and fee information in accordance with some embodiments of the present disclosure. Confirmation screen 1002 may be generated by control circuitry 304 in response to a user request to shift a media asset to a new time and/or content source. For example, control circuitry 304 may present the user with confirmation screen 1002 after the user has input a requested time and/or content source into one of availability window information screens 530, 630, or 730 and selected confirmation button 536, 640, or 740. Alternatively, confirmation screen 1002 may be generated when the user selects an alternate time and/or content source using the "drag and drop" feature as discussed above in relation to FIGS. 8a and 8b. In the example depicted in FIG. 10, the confirmation screen 1002 is generated by control circuitry 304 as an overlay above an interactive media guidance application screen similar to the display screen shown in FIG. 1. In alternate embodiments, the confirmation screen 1002 may be overlaid over other interactive media guidance application screens, such as the one shown in FIG. 2, or over a media asset that is currently being viewed by the user. In still other embodiments, the confirmation screen 1002 may be a separate full-screen display.

Confirmation screen 1002 may include confirmation statement 1004, subscription statement 1012, confirmation button 1018, and cancel button 1014. The confirmation statement 1004 may include a media asset identifier field 1006, a content source field 1008, and time identifier field 1010. The fields 1006, 1008, and 1010 may be populated with the user's selections from one of the availability window information screens 530, 630, or 730 or alternatively from the user's "drag and drop" selection on grid 802.

The subscription statement 1012 may include subscription field 1014 and fee field 1016. As described above, control circuitry 304 may retrieve subscription information from a user profile stored in storage 308, from a remote server 415, or a combination of the two. Control circuitry 304 may also receive permissions data from media content source 416 indicating whether the user may make the requested shift and any associated fees. In some embodiments, control circuitry 304 may query the media content source 416 or remote server 415 to provide subscription information or permissions data associated with the user. The name of a subscription held by the user may be displayed in subscription field 1014. If no subscription is held by the user, such as in the example depicted in FIG. 10, the subscription field may indicate "None". Control circuitry 304 may compare the user-requested content source with the content sources listed in the subscription information to determine if payment is required for the requested shift. In addition, control circuitry 304 may access permissions data to determine the fees associated with the requested shift. In the example depicted in FIG. 10, where no subscription is held, fee field 1016 may display a one-time fee associated with the shift. In some embodiments, the one-time fee may change depending on the requested content source or time. For example, shifting a media asset to a primetime evening hour may require a higher one-time fee than shifting the same media asset to an early morning hour.

The user may confirm the shift by selecting the confirm button 1018 or cancel his choice by selecting the cancel button 1020. In response to a user selection of the confirm button 1018, control circuitry 304 may determine whether the user-requested time and content source fall within the availability window of the media asset. If the user-requested time does not fall within the availability window of the media asset, control circuitry 304 may generate a notification to the user indicating that the requested move could not be completed. If the user-requested time falls within the availability window of the media asset, control circuitry 304 may generate a payment screen requesting payment from the user if a fee is required for the switch. The payment screen may process payment through a credit card account, PayPal account, bank account, or other payment methods. In other embodiments, payment may be billed directly to a monthly bill associated with the user's service provider. In yet other embodiments, the payment may be processed by using credits, such as reward credits in a user account. Upon successful payment of any fees required, control circuitry 304 may update the program guide screen to display the media asset at the requested time and content source. In some embodiments, the user may not be charged until the media asset is delivered at the user-requested time and content source. In response to a user selection of the cancel button 1014, control circuitry 304 may return the user back to one of the availability window information screens 530, 630, or 730, the display screen 800, or the display screen 100.

Figure 11:
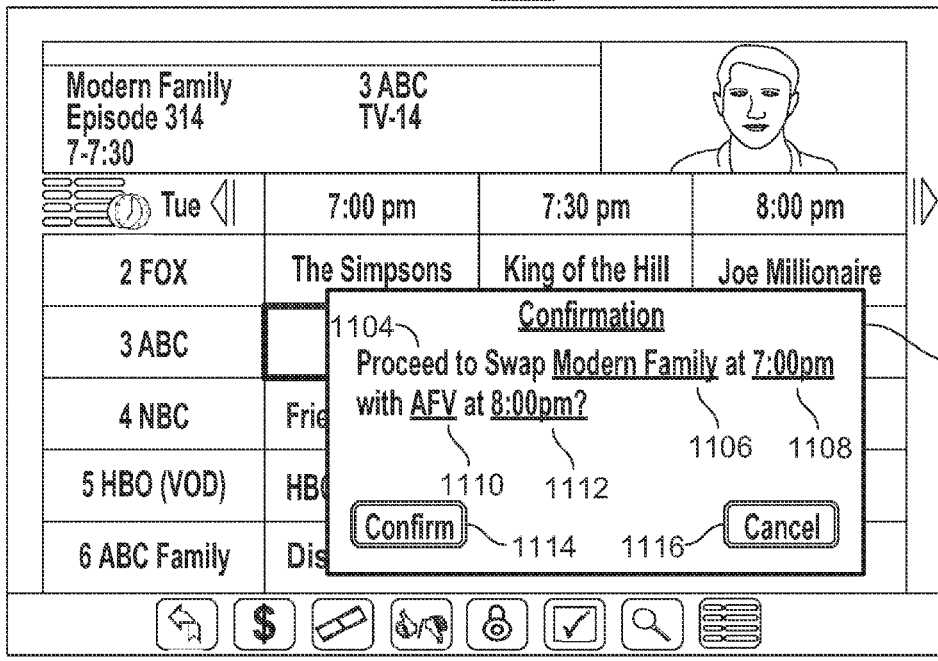
FIG. 11 shows an illustrative confirmation display screen regarding a swap of a first and a second media asset in accordance with some embodiments of the present disclosure.

FIG. 11 shows an illustrative confirmation display screen 1100 regarding a swap of a first and a second media asset in accordance with some embodiments of the present disclosure. Confirmation screen 1102 may be generated by control circuitry 304 in response to a user request to shift a media asset to a new time and/or content source. For example, control circuitry 304 may present the user with confirmation screen 1102 after the user has input a requested time and/or content source into one of availability window information screens 530, 630, or 730 and selected confirmation button 536, 640, or 740. Alternatively, confirmation screen 1102 may be generated when the user selects an alternate time and/or content source using the "drag and drop" feature as discussed above in relation to FIGS. 8a and 8b. For example, control circuitry 304 may generate confirmation screen 1102 in response to a user selection of a first and a second media asset. In the example depicted in FIG. 11, the confirmation screen 1102 is generated by control circuitry 304 as an overlay above an interactive media guidance application screen similar to the display screen shown in FIG. 1. In alternate embodiments, the confirmation screen 1102 may be overlaid over other interactive media guidance application screens, such as the one shown in FIG. 2, or over a media asset that is currently being viewed by the user. In still other embodiments, the confirmation screen 1102 may be a separate full-screen display.

Confirmation screen 1102 may include confirmation statement 1104, confirmation button 1114, and cancel button 1116. The confirmation statement 1104 may include a first media asset identifier field 1106, a first time identifier field 1108, a second media asset identifier field 1110, and a second time identifier field 1112. The fields 1106 and 1108 may be populated with the title of the first media asset and the transmission time associated with the first media asset respectively. The fields 1110 and 112 may be populated with the title of the second media asset and the transmission time associated with the second media asset. The user may confirm the swap by selecting the confirm button 1114 or cancel his choice by selecting the cancel button 1116. In response to a user selection of the confirm button 1114, control circuitry 304 may determine whether the transmission time and content source of the second media asset fall within the availability window associated with the first media asset. Additionally, control circuitry 304 may determine whether the transmission time and content source of the first media asset fall within the availability window associated with the second media asset. If control circuitry 304 determines that either the first or the second media asset is unable to be swapped to the requested time, control circuitry 304 may generate a notification to the user indicating that the requested swap could not be completed. If control circuitry 304 determines that the transmission time and content source of both the first and the second media asset fall within the availability window of the other, control circuitry 304 may update the program guide screen to display the first media asset at the original transmission time and content source of the second media asset and the second media asset at the original transmission time and content source of the first media asset. In response to a user selection of the cancel button 1116, control circuitry 304 may return the user back to one of the availability window information screens 530, 630, or 730, the display screen 800, or the display screen 100.

Figure 12:
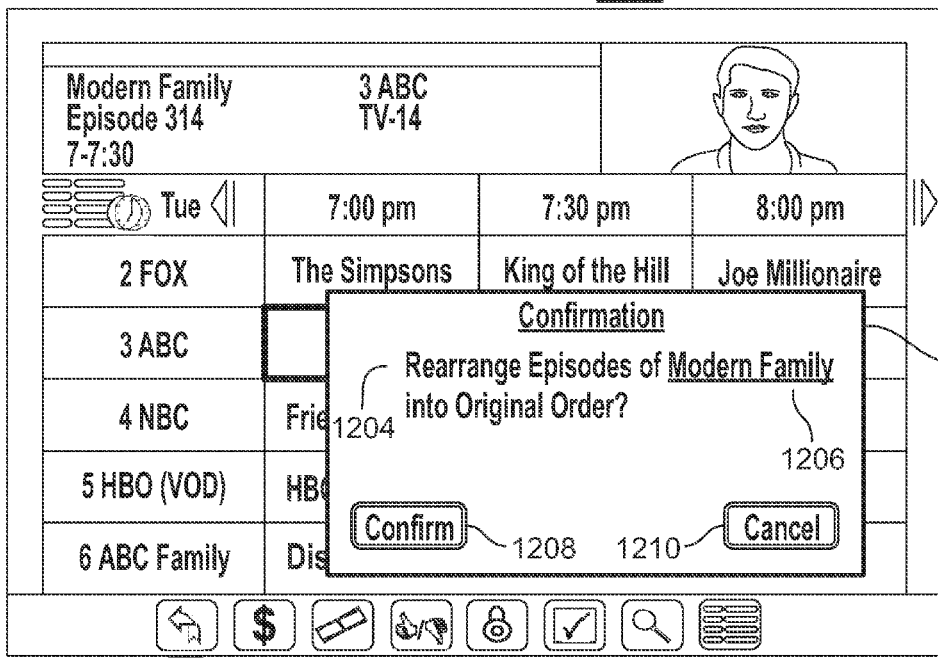
FIG. 12 shows an illustrative confirmation screen to rearrange related media assets in accordance with some embodiments of the present disclosure.

FIG. 12 shows an illustrative confirmation screen to rearrange related media assets in accordance with some embodiments of the present disclosure. Confirmation screen 1202 may be generated by control circuitry 304 after control circuitry 304 has successfully shifted a media asset to a user-requested time and/or content source. In some embodiments, control circuitry 304 may generate confirmation screen 1202 in response to the user selecting multiple program listings, for example in grid 102, and selecting an option in options region 126 to rearrange the media assets. Control circuitry 304 may compare the media guidance information associated with each of the program listings to identify related media assets. For example, control circuitry 304 may compare the titles, series name, series ID, or episode numbers to identify episodes of the same series. In the example depicted in FIG. 12, control circuitry 304 has detected several episodes of the series "Modern Family" and is requesting confirmation from the user to rearrange the episodes into the original episode order through confirmation screen 1202.

In the example depicted in FIG. 12, the confirmation screen 1202 is generated by control circuitry 304 as an overlay above an interactive media guidance application screen similar to the display screen shown in FIG. 1. In alternate embodiments, the confirmation screen 1202 may be overlaid over other interactive media guidance application screens, such as the one shown in FIG. 2, or over a media asset that is currently being viewed by the user. In still other embodiments, the confirmation screen 1202 may be a separate full-screen display.

Confirmation screen 1202 may include confirmation statement 1204, confirmation button 1208, and cancel button 1210. The confirmation statement 1204 may include a related media asset identifier field 1206, which indicates a characteristic common between the related media assets. For example, the related media asset identifier field 1206 may display the name of a series to which the related media assets belong. The user may confirm the rearrangement by selecting the confirm button 1208 or cancel rearrangement by selecting the cancel button 1210. In response to a user selection of the confirm button 1208, control circuitry 304 may determine an original order for the related media assets, for example based on the original transmission order for the related media assets or an episode number associated with each of the related media assets. Control circuitry 304 may identify an availability window and a transmission time associated with each of the related media assets and determine whether the related media assets may be shifted into the original order. If, based on the availability windows of the related media assets, the media assets cannot be rearranged into the original order, control circuitry 304 may generate a notification to the user indicating that the requested rearrangement could not be completed. If control circuitry 304 determines that the media assets can be rearranged into the original order, control circuitry 304 may update the program guide screen to display the related media assets in the original order. In response to a user selection of the cancel button 1210, control circuitry 304 may return the user back to one of the availability window information screens 530, 630, or 730, the display screen 800, or the display screen 100.

Figure 13:
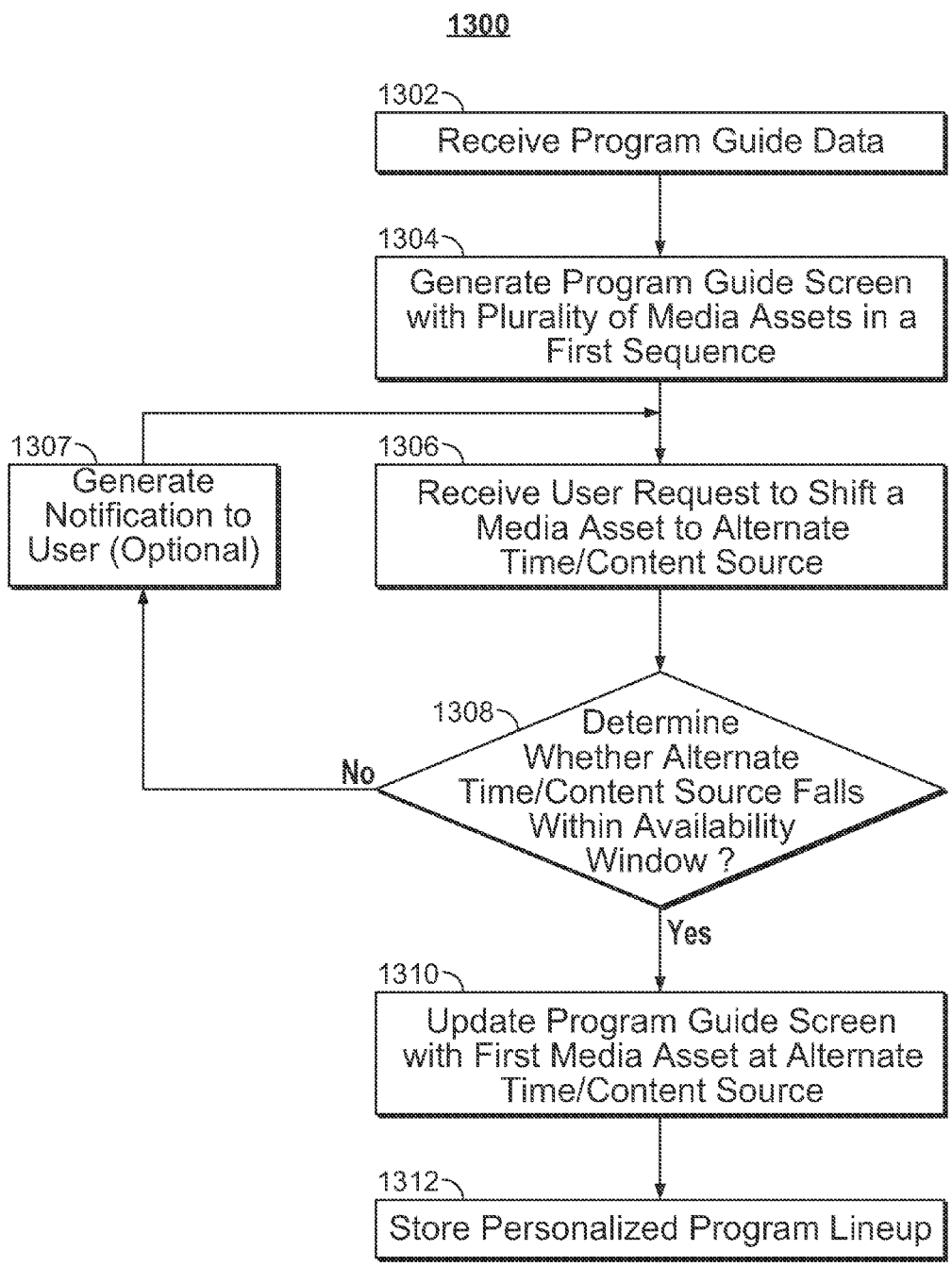
FIG. 13 illustrates a flow diagram for defining a personalized program lineup in accordance with some embodiments of the present disclosure.

FIG. 13 illustrates a flow diagram 1300 for defining a personalized program lineup in accordance with some embodiments of the present disclosure. The steps of flow diagram 1300 are performed by a processing device, such as control circuitry 304 of user equipment 300. In certain embodiments, a similar processing device at remote server 415 may perform the steps of flow diagram 1300, and in yet other embodiments, the steps of flow diagram 1300 may be performed by a combination of processing devices at remote server 415 and one or more of user equipment 402, 404, and 406.

At step 1302, the processing device may receive program guidance data from media guidance data source 418. The program guidance data may include information on a plurality of media assets, including transmission times, transmission channels or content sources, titles, descriptions, series names, series IDs, episode numbers, parental ratings, popularity ratings, critic's ratings, descriptions, summaries, reviews, genre or category information, actor information, logo data, or any other information related to the plurality of media assets. In addition, the program guidance data may include information on the availability window associated with each of the plurality of media assets. In alternate embodiments, data indicating the availability windows may be received separately from the program guidance data, for example from media content source 416 or remote server 415.

At step 1304, the processing device may generate a program guide screen based on the received program guidance data. The processing device may display the plurality of media assets in a first sequence according to their scheduled transmission times and content sources. Users may navigate on the program guide screen, such as the display screens illustrated in FIGS. 1 and 2, using user input interface 310. The storage 308 at user equipment 300 and/or the media guidance data source 418 may store past program guidance data up to a set amount of time, allowing the processing device to present past program listings in the program guide screen. The user may select a media asset, for example, by highlighting the asset using highlight indicator 110 and pressing a "select" or equivalent key on user input interface 310. Upon selecting a media asset, the processing device may display the availability window associated with the selected media asset, either through a separate availability window information screen as discussed above in relation to FIGS. 5-7 or by highlighting a region directly on grid 102 corresponding to the availability window, as discussed above in relation to FIG. 8.

At step 1306, the processing device may receive a user request to shift a media asset to an alternate time and/or content source. In some embodiments, the user request may be a selection of an alternate time on grid 102 using highlight region 110. In other embodiments, the user may be presented with an option in options region 126 to input a time and content source to access the selected media asset. The specified time may occur on any suitable increment, such as a half-hour, hour, or other user-defined interval of time. For example, specifying times in half-hour increments may allow the user to easily swap programs and rearrange originally scheduled programming. Alternatively, the user request may be a user input in any one of availability window information screens 530, 630, 730, or equivalents thereof.

At step 1308, the processing device determines whether the alternate time and content source as requested by the user falls within the availability window associated with the selected media asset. The processing device may access data indicating the availability window associated with the selected media asset and identify an interval or intervals of time during which the media asset may be accessed from content source 416. The processing device may also identify from the data a predetermined set of content sources over which the media asset may be accessed. The processing device may compare the requested time with the identified time intervals to determine whether the media asset may be accessed from the media content source 416 at the requested time. If the requested time does not fall within one of the identified intervals of time, or the requested content source is not included in the identified set of content sources over which the media asset may be received, the processing device may generate an optional notification at step 1307 that the request could not be completed. The notification may include a reason that the requested shift could not be completed, such as the requested time being outside the available times, or the requested content source not being included in the set of available content sources. After generating the notification, the processing device may return the user to one of availability window information screens 530, 630, or 730, or to one of display screens 100, 200, or 800. The processing device may then await another user request at step 1306.

If the requested time and content source fall within the availability window associated with the selected media asset, the processing device may determine whether the user has the necessary permissions to make the shift. In some embodiments, the processing device may transmit the request to media content source 416 to determine whether the user has permission to shift the media asset to the requested time. Media content source 416 may determine the user's subscription status, for example by accessing a user profile stored at the user equipment, media content source 416, remote server 415, or a combination of the above. Media content source 416 may also determine whether the requested shift is associated with any fees. For example, purchasing a subscription may allow the user to shift the media asset to a predetermined set of content sources for free or for a reduced price. Alternatively, shifting a media asset may be associated with a one-time fee. Once the user's subscription status and/or payment information is verified, media content source 416 may transmit permissions data to user equipment 300 confirming that the user may make the requested shift. In some embodiments, the permissions data may be included in the user profile stored at the user equipment, remote server 415, media content source 416, or a combination of the above.

In some embodiments, the permissions data may include a list of one or more remote servers 415 that may provide the requested media asset at the requested time. For example, remote server 415 may comprise an Internet source which may stream the requested media asset to user equipment 300. In some embodiments, the permissions data may also include access rights to the list of remote servers 415. For example, the permissions data may include an access key which allows the processing device to access media content from remote server 415, whereas the media content might otherwise not be available to users without the access key.

Once the processing device has verified that the user has the necessary permissions to make the shift, the processing device may update the program guide screen at step 1310 with the selected media asset at the requested time and content source. In some embodiments, the selected media asset may replace the originally-scheduled media asset at the requested time such that the originally-scheduled media asset is "overwritten." In other embodiments, the processing device may automatically shift other media assets affected by the user request forward or backward such that the shifted media asset is "inserted" into the program lineup without a loss of programming.

At step 1312, the processing device may store the personalized program lineup onto any suitable electronic storage device. The electronic storage device may reside within user equipment device 300, such as storage device 308, at a remote server 415, or a combination of the two. In embodiments where the personalized program lineup is stored at a remote server 415, the personalized program lineup may be synchronized across multiple user equipment devices using the cloud-based services as described above. For example, a user may construct a personalized program lineup on a first user equipment device, such as a mobile phone 406, store the personalized program lineup at a remote server 415, and access the program lineup on a second user equipment device, such as user television equipment 402. The various user equipment devices may be associated with any suitable interactive application for allowing the user to define a personalized program lineup, such as an interactive guidance application running on a set-top-box, a web browser accessed from a personal computer, a mobile application running on a mobile phone, or any other suitable user interface as will be appreciated by one skilled in the art.

Figure 14:
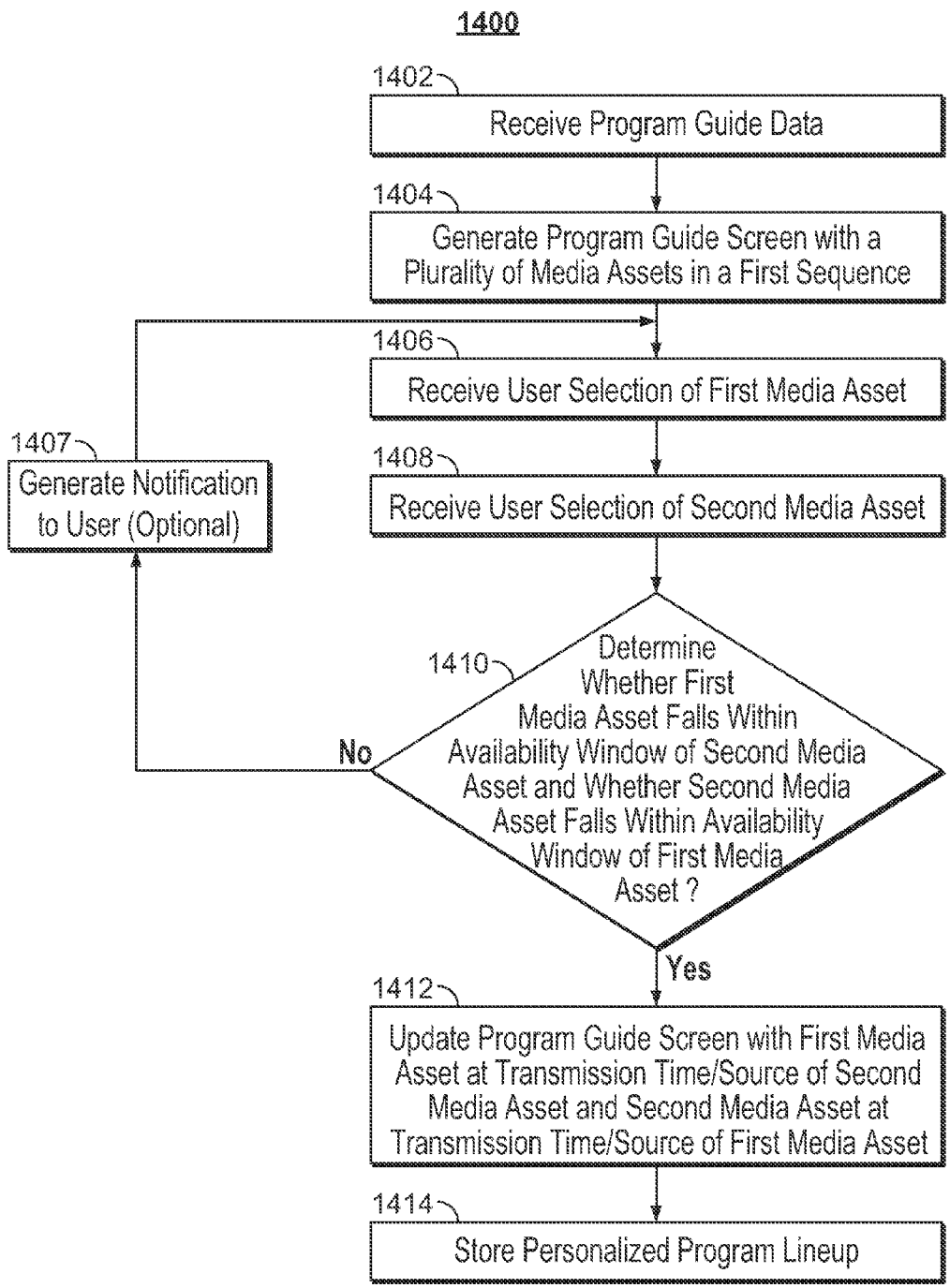
FIG. 14 illustrates another flow diagram for defining a personalized program lineup in accordance with some embodiments of the present disclosure.

FIG. 14 illustrates another flow diagram 1400 for defining a personalized program lineup in accordance with some embodiments of the present disclosure. The steps of flow diagram 1400 are performed by a processing device, such as control circuitry 304 of user equipment 300. In certain embodiments, a similar processing device at remote server 415 may perform the steps of flow diagram 1400, and in yet other embodiments, the steps of flow diagram 1400 may be performed by a combination of processing devices at remote server 415 and one or more of user equipment 402, 404, and 406.

At step 1402, the processing device may receive program guidance data from media guidance data source 418. The program guidance data may include information on a plurality of media assets, including transmission times, transmission channels or content sources, titles, descriptions, series names, series IDs, episode numbers, parental ratings, popularity ratings, critic's ratings, descriptions, summaries, reviews, genre or category information, actor information, logo data, or any other information related to the plurality of media assets. In addition, the program guidance data may include information on the availability window associated with each of the plurality of media assets. In alternate embodiments, data indicating the availability windows may be received separately from the program guidance data, for example from media content source 416 or remote server 415.

At step 1404, the processing device may generate a program guide screen based on the received program guidance data. The processing device may display the plurality of media assets in a first sequence according to their scheduled transmission times and content sources. Users may navigate on the program guide screen, such as the display screens illustrated in FIGS. 1 and 2, using user input interface 310. The storage 308 at user equipment 300 and/or the media guidance data source 418 may store past program guidance data up to a set amount of time, allowing the processing device to present past program listings in the program guide screen. The user may select a media asset, for example, by highlighting the asset using highlight indicator 110 and pressing a "select" or equivalent key on user input interface 310. Upon selecting a media asset, the processing device may display the availability window associated with the selected media asset, either through a separate availability window information screen as discussed above in relation to FIGS. 5-7 or by highlighting a region directly on grid 102 corresponding to the availability window, as discussed above in relation to FIG. 8.

At step 1406, the processing device may receive a user selection of a first media asset, and at step 1408, the processing device may receive a user selection of a second media asset. The processing device may query the user, for example using confirmation screen 1102, whether to swap the transmission time and/or content sources of the first and the second media asset. At step 1410, the processing device may determine whether the scheduled transmission time and content source associated with the second media asset falls within the availability window of the first media asset. The processing device may access data indicating the availability window associated with the first media asset and identify an interval or intervals of time during which the first media asset may be accessed from content source 416. The processing device may also identify from the data a predetermined set of content sources over which the first media asset may be accessed. The processing device may compare the transmission time of the second media asset with the identified time intervals to determine whether the first media asset may be accessed from the media content source 416 at the transmission time of the second media asset. In a similar manner, the processing device may determine whether the transmission time and content source of the first media asset falls within the availability window of the second media asset, thereby allowing the second media asset to be shifted to the transmission time and content source of the first media asset. If the processing device determines that either the first or the second media asset is unable to be swapped to the requested time, the processing device may generate an optional notification at step 1407 that the request could not be completed. The notification may include a reason that the requested shift could not be completed, such as the requested time for the first media asset being outside the available times, or the requested content source for the first media asset not being included in the set of available content sources. After generating the notification, the processing device may return the user to one of availability window information screens 530, 630, or 730, or to one of display screens 100, 200, or 800. The processing device may then await another user request at step 1406.

If the processing device determines that the transmission time and content source of both the first and the second media asset fall within the availability window of the other, the processing device may determine whether the user has the necessary permissions to make the swap. In some embodiments, the processing device may transmit the request to one or more media content sources 416 to determine whether the user has permission to shift the first media asset to the original transmission time of the second media asset and to shift the second media asset to the original transmission time of the first media asset. Media content source 416 may determine the user's subscription status, for example by accessing a user profile stored at the user equipment, media content source 416, remote server 415, or a combination of the above. Media content source 416 may also determine whether the requested shifts are associated with any fees. For example, purchasing a subscription may allow the user to shift the media asset to a predetermined set of content sources for free or for a reduced price. Alternatively, shifting a media asset may be associated with a one-time fee. Once the user's subscription status and/or payment information is verified, the one or more media content sources 416 may transmit permissions data to user equipment 300 confirming that the user may make the requested shifts. In some embodiments, the permissions data may be included in the user profile stored at the user equipment, remote server 415, media content source 416, or a combination of the above.

In some embodiments, the permissions data may include a list of one or more remote servers 415 that may provide the requested media asset at the requested time. For example, remote server 415 may comprise an Internet source which may stream the requested media asset to user equipment 300. In some embodiments, the permissions data may also include access rights to the list of remote servers 415. For example, the permissions data may include an access key which allows the processing device to access media content from remote server 415, whereas the media content might otherwise not be available to users without the access key.

Once the processing device has verified that the user has the necessary permissions to make the swap, the processing device may update the program guide screen at step 1412 with the first media asset at the transmission time and content source of the second media asset and the second media asset at the transmission time and content source of the first media asset.

At step 1414, the processing device may store the personalized program lineup onto any suitable electronic storage device. The electronic storage device may reside within user equipment device 300, such as storage device 308, at a remote server 415, or a combination of the two. In embodiments where the personalized program lineup is stored at a remote server 415, the personalized program lineup may be synchronized across multiple user equipment devices using the cloud-based services as described above. For example, a user may construct a personalized program lineup on a first user equipment device, such as a mobile phone 406, store the personalized program lineup at a remote server 415, and access the program lineup on a second user equipment device, such as user television equipment 402. The various user equipment devices may be associated with any suitable interactive application for allowing the user to define a personalized program lineup, such as an interactive guidance application running on a set-top-box, a web browser accessed from a personal computer, a mobile application running on a mobile phone, or any other suitable user interface as will be appreciated by one skilled in the art.

Figure 15:
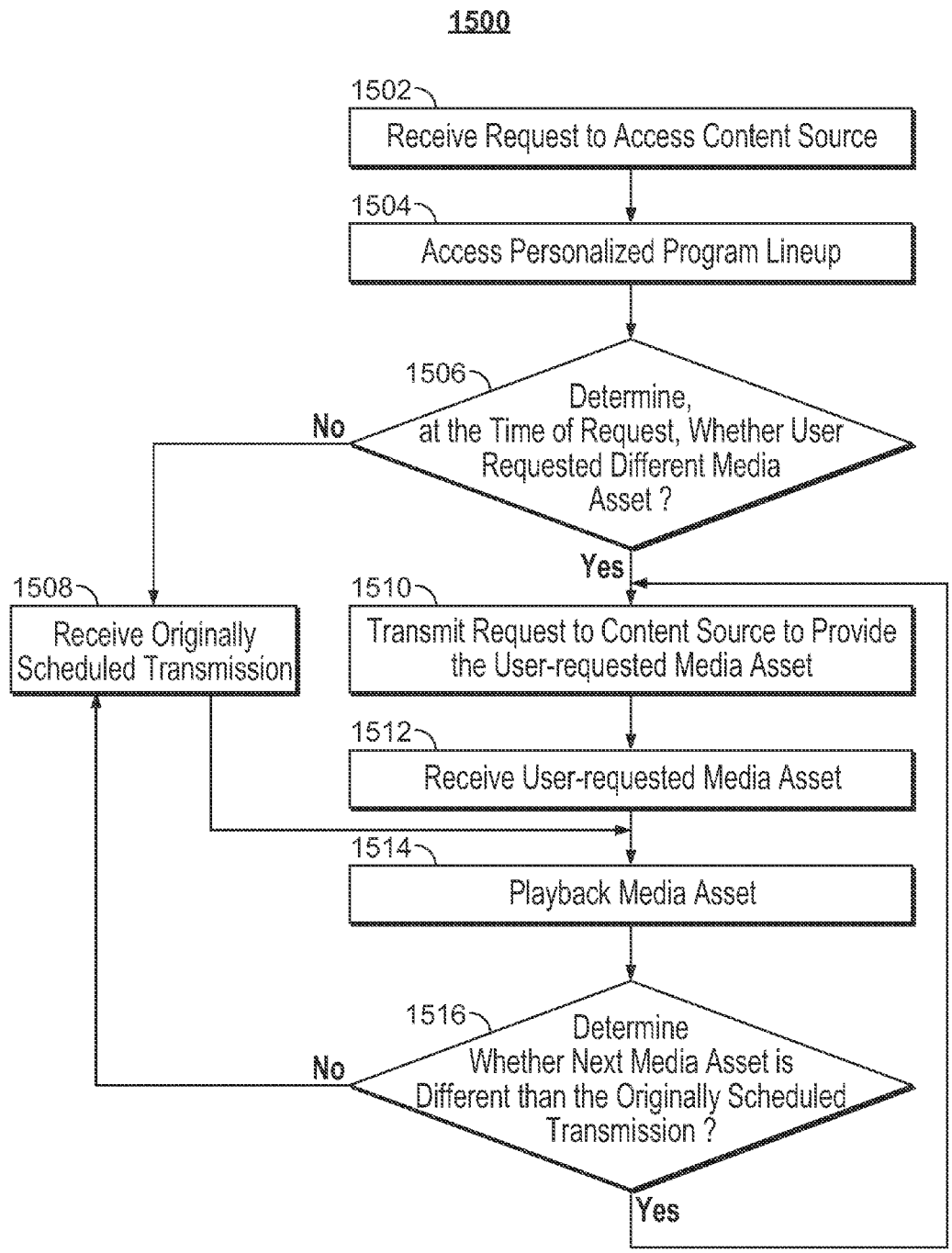
FIG. 15 illustrates a flow diagram for delivering content according to a personalized program lineup in accordance with some embodiments of the present disclosure.

FIG. 15 illustrates a flow diagram 1500 for delivering content according to a personalized program lineup in accordance with some embodiments of the present disclosure. The steps of flow diagram 1500 are performed by a processing device, such as control circuitry 304 of user equipment 300. In certain embodiments, a similar processing device at remote server 415 may perform the steps of flow diagram 1500, and in yet other embodiments, the steps of flow diagram 1500 may be performed by a combination of processing devices at remote server 415 and one or more of user equipment 402, 404, and 406.

At step 1502, the processing device may receive a request to access a content source 416. For example, the processing device may receive a user input from user input interface 310 to tune to a broadcast channel provided by content source 416. At step 1504, the processing device may access or retrieve a personalized program lineup associated with the user. As discussed above, the personalized program lineup may be stored at an electronic storage device, such as storage device 308, a similar storage device at remote server 415, or a combination of the two. The personalized program lineup defines a sequence of media assets that has been modified by the user from their originally-scheduled transmission times.

At step 1506, the processing device uses the personalized program lineup to determine, at the current time, whether the user has requested a different media asset than the originally-scheduled transmission from content source 416. If the user has not made a custom request at the current time, the processing device may receive the originally-scheduled media asset from the content source 416 at step 1508 and playback the media asset at step 1514. If the user has requested a different media asset than the originally-scheduled transmission at the current time, the processing device may transmit a request to content source 416 to provide the user-requested media asset at step 1510. In some embodiments, control circuitry receives the media asset directly from media content source 416 at the requested time. In other embodiments, media content source 416 may access an external server, such as remote server 415, to provide the media asset at the requested time. In yet other embodiments, the processing device may receive the media asset directly from remote server 415 instead of content source 416. For example, the remote server 415 may be an online streaming source associated with the content source 416 that may provide the broadcast media asset on-demand over the Internet. In these embodiments, the processing device may need to access certain access rights for remote server 415, such as an access key provided by media content source 416.

In some embodiments, the request to access the content source may come in the middle of a media asset to be received according to the personalized program lineup. For example, the user may request an episode of "Modern Family" to air on ABC at 7 pm, but not tune to ABC until 7:15, halfway through the episode. In such embodiments, the processing device may transmit a request to media content source 416 or remote server 415 to provide the user-requested media asset starting at an intermediate point corresponding to the current time. In the example provided above, media content source 416 or remote server 415 would provide the episode of "Modern Family" starting 15 minutes into the episode. The processing device receives the user-requested media asset from content source 416 or remote server 415 at step 1512 and plays back the user-requested media asset at step 1514.

At step 1516, the processing device may finish playback of the media asset and automatically determine, based on the personalized program lineup at the current time, whether the next media asset is different from the originally-scheduled transmission from content source 416. If the user has not made a custom request, the processing device may revert back to step 1508 and receive the originally-scheduled media asset. If the user has requested a different media asset than the originally-scheduled transmission, the processing device may revert back to step 1510 and transmit a request to content source 416 or remote server 415 to provide the user-requested media asset. In some embodiments, control circuitry 304 transmits the request prior to the completion of the previous media asset and buffers the next media asset in storage 308 in anticipation of playback. In this manner, media assets are automatically delivered to user equipment 300 according to the personalized program lineup without further user input.

Figure 16:
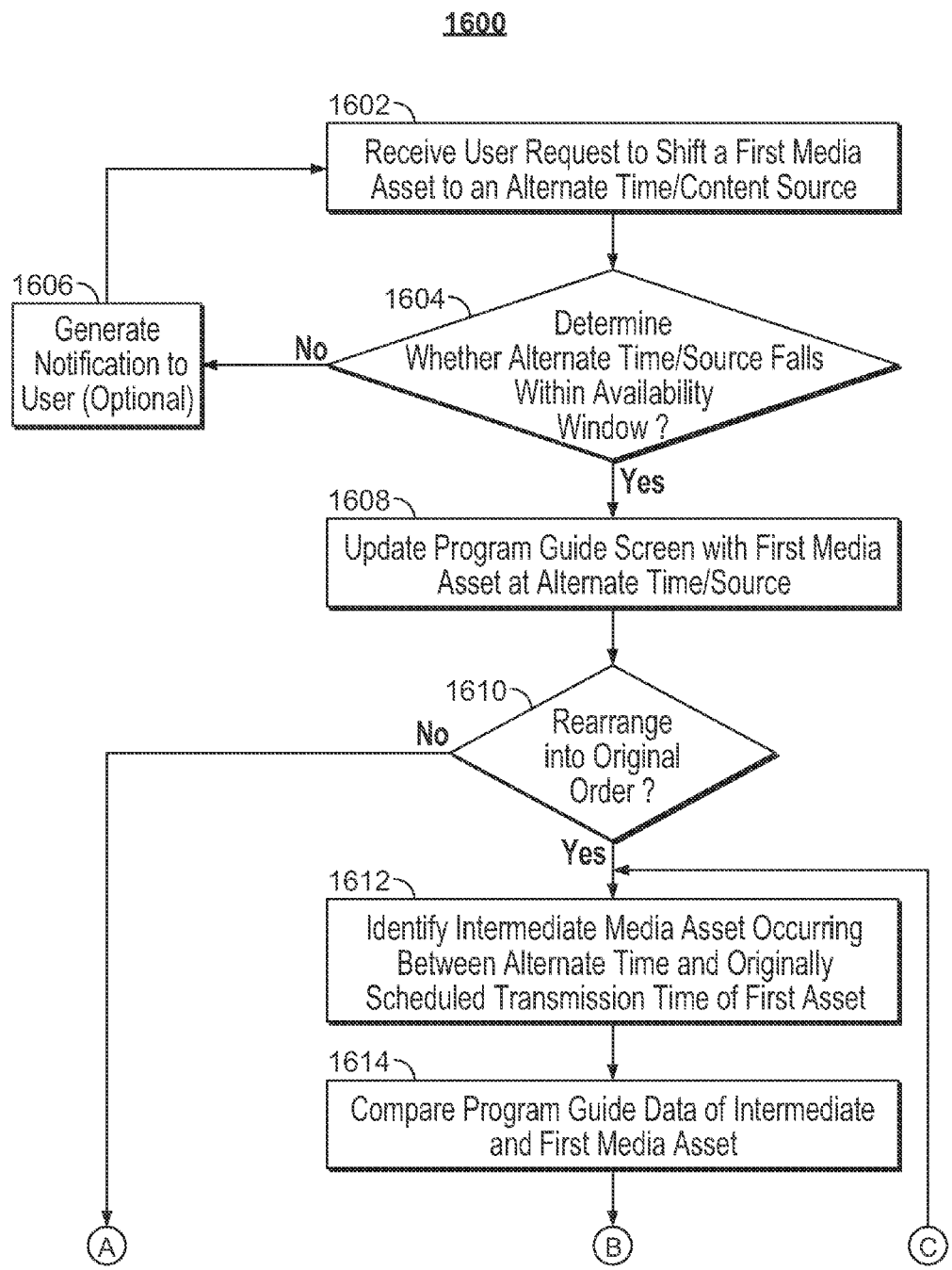
FIG. 16 illustrates a flow diagram for rearranging related media assets in accordance with some embodiments of the present disclosure.
Figure 16:
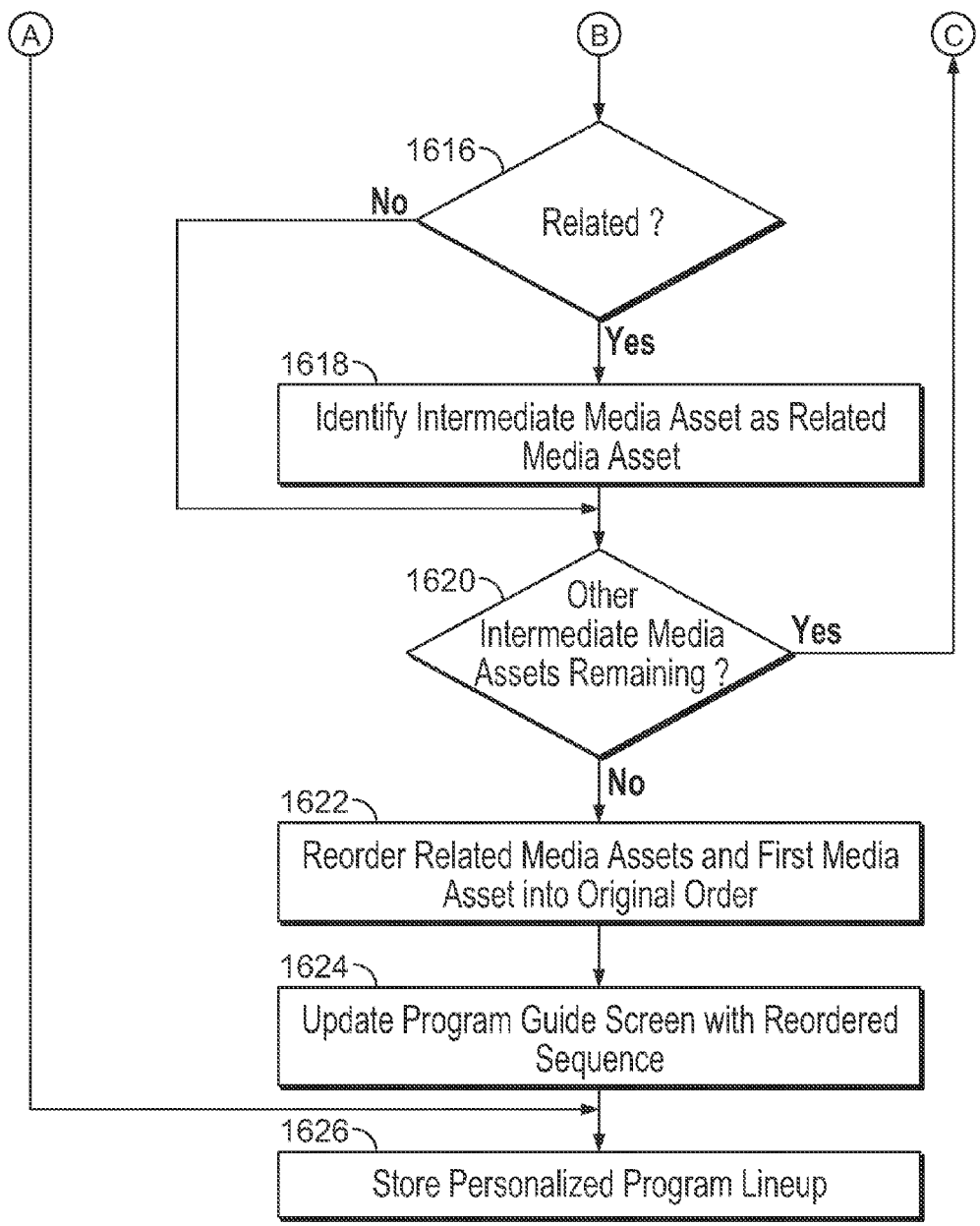

FIG. 16 illustrates a flow diagram 1600 for rearranging related media assets in accordance with some embodiments of the present disclosure. The steps of flow diagram 1600 are performed by a processing device, such as control circuitry 304 of user equipment 300. In certain embodiments, a similar processing device at remote server 415 may perform the steps of flow diagram 1400, and in yet other embodiments, the steps of flow diagram 1400 may be performed by a combination of processing devices at remote server 415 and one or more of user equipment 402, 404, and 406.

At step 1602, the processing device may receive a user request to shift a first media asset to an alternate time and/or content source. In some embodiments, the user request may be a selection of an alternate time on grid 102 using highlight region 110. In other embodiments, the user may be presented with an option in options region 126 to input a time and content source to access the selected media asset. The specified time may occur on any suitable increment, such as a half-hour, hour, or other user-defined increment of time. For example, specifying times in half-hour increments may allow the user to easily swap programs and rearrange originally scheduled programming. Alternatively, the user request may be a user input in any one of availability window information screens 530, 630, 730, or equivalents thereof.

At step 1604, the processing device determines whether the alternate time and content source as requested by the user falls within the availability window associated with the first media asset. The processing device may access data indicating the availability window associated with the first media asset and identify an interval or intervals of time during which the media asset may be accessed from content source 416. The processing device may also identify from the data a predetermined set of content sources over which the media asset may be accessed. The processing device may compare the requested time with the identified time intervals to determine whether the media asset may be accessed from the media content source 416 at the requested time. If the requested time does not fall within one of the identified intervals of time, or the requested content source is not included in the identified set of content sources over which the media asset may be received, the processing device may generate an optional notification at step 1606 that the request could not be completed. The notification may include a reason that the requested shift could not be completed, such as the requested time being outside the available times, or the requested content source not being included in the set of available content sources. After generating the notification, the processing device may return the user to one of availability window information screens 530, 630, or 730, or to one of display screens 100, 200, or 800. The processing device may then await another user request at step 1602.

If the requested time and content source fall within the availability window associated with the first media asset, the processing device may update the program guide screen at step 1608 with the first media asset at the requested time and content source. In some embodiments, the first media asset may replace the originally-scheduled media asset at the requested time such that the originally-scheduled media asset is "overwritten." In other embodiments, the processing device may automatically shift other media assets affected by the user request forward or backward such that the shifted media asset is "inserted" into the program lineup without a loss of programming.

At step 1610, the processing device may query the user whether to rearrange related media assets into an original order. The processing device may query the user by generating a confirmation screen, such as confirmation screen 1202 depicted in FIG. 12. In some embodiments, the original order may comprise an original broadcast order, while in other embodiments, the original order may comprise an episode numbering order of a series. For example, if a later episode of a series is moved before an earlier episode of the same series, the processing device may query the user to rearrange the episodes in the original episode order.

If the user chooses not to rearrange the related media assets, the processing device may store the personalized program lineup at step 1628. If the user chooses to rearrange the related media assets, the processing device may proceed to identify the related media assets in the loop defined by steps 1612-1620. At step 1612, the processing device identifies an intermediate media asset which occurs between the originally-scheduled transmission time of the first media asset and the alternate time requested by the user. At step 1614, the processing device compares the program guidance data of the intermediate asset and the first media asset to determine whether the intermediate asset is related to the first media asset. For example, the processing device may compare program titles, series titles, series IDs, episode numbers, actor names, etc. to determine whether the media assets are related.

At step 1616, the processing device may decide, based on the comparison of program guidance data, whether the intermediate media asset is related to the first media asset. If the media assets are related, the processing device may identify the intermediate media asset as a related media asset at step 1618, for example by adding the intermediate media asset to a list of related media assets stored in electronic storage 308. If the media assets are not related, the processing device may proceed directly to step 1620, where the processing device may determine whether there are further intermediate media assets between the originally-scheduled transmission time of the first media asset and the alternate time requested by the user. If other intermediate media assets remain to be compared to the first media asset, the processing device may return to step 1612 and repeat steps 1612-1618 with another intermediate asset.

If all the intermediate media assets have been compared to the first media asset, the processing device may proceed to step 1622 and reorder the related media assets and the first media asset into an original order. The processing device may identify a transmission time and availability window associated with each of the related media assets and determine whether the related media assets may be shifted into the original order. If, based on the availability windows of the related media assets, the related media assets cannot be shifted into the original order, the processing device may generate a notification to the user similar to the notification generated at step 1606. If the processing device determines that the media assets can be shifted to the original order, the processing device may update the program guide screen with the reordered sequence at step 1624.

At step 1626, the processing device may store the personalized program lineup onto any suitable electronic storage device. The electronic storage device may reside within user equipment device 300, such as storage device 308, at a remote server 415, or a combination of the two. In embodiments where the personalized program lineup is stored at a remote server 415, the personalized program lineup may be synchronized across multiple user equipment devices using the cloud-based services as described above. For example, a user may construct a personalized program lineup on a first user equipment device, such as a mobile phone 406, store the personalized program lineup at a remote server 415, and access the program lineup on a second user equipment device, such as user television equipment 402. The various user equipment devices may be associated with any suitable interactive application for allowing the user to define a personalized program lineup, such as an interactive guidance application running on a set-top-box, a web browser accessed from a personal computer, a mobile application running on a mobile phone, or any other suitable user interface as will be appreciated by one skilled in the art.

It will be apparent to those of ordinary skill in the art that methods, techniques, and processes involved in the present disclosure may be embodied in a computer program product that includes a non-transitory computer usable and/or readable medium. For example, such a non-transitory computer readable medium may consist of a read-only memory device, such as a CD-ROM disk or conventional ROM devices, or a random access memory, such as a hard drive device or a computer diskette, having a computer readable program code stored thereon.

It is to be understood that while certain forms of the present disclosure have been illustrated and described herein, it is not to be limited to the specific forms or arrangement of parts described and shown. Those skilled in the art will know or be able to ascertain using no more than routine experimentation, many equivalents to the embodiments and practices described herein. Accordingly, it will be understood that the invention is not to be limited to the embodiments disclosed herein, which are presented for purposes of illustration and not of limitation.

What is claimed is:

1. A method for delivering content to a user, the method comprising:
   receiving, at a current time, a user request to access a content source, wherein the content source is scheduled to transmit a first plurality of media assets according to a first schedule;
   receiving a user request to receive a second plurality of media assets according to a second schedule different than the first schedule;
   identifying a first media asset of the first plurality of media assets that is scheduled to be transmitted at the current time according to the first schedule;
   identifying a second media asset of the second plurality of media assets that is scheduled to be transmitted at the current time according to the second schedule; and
   in response to determining that the first media asset is different from the second media asset, automatically receiving the second media asset instead of the first media asset.

2. The method of claim 1, wherein automatically receiving the second media asset instead of the first media asset comprises:
   automatically transmitting a communication to a second content source requesting that the second content source make the second media asset available at the current time; and
   receiving the second media asset from the second content source.

3. The method of claim 2, wherein the second content source is one of the group of: a television distribution facility, a broadcast provider, a cable system head end, a service provider, a satellite distribution facility, a video on-demand server, an internet server, a website, or a remote recording device.

4. The method of claim 1 wherein automatically receiving the second media asset comprises automatically receiving the second media asset starting at an intermediate point in the second media asset corresponding to the current time relative to a starting position of the second media asset in the second schedule.

5. The method of claim 1, wherein receiving a user request to receive the second plurality of media assets according to the second schedule comprises receiving a user input to shift the second media asset from a scheduled time in the first schedule to a different time in the second schedule.

6. The method of claim 5 wherein the different time in the second schedule occurs prior to the scheduled time in the first schedule.

7. The method of claim 5 wherein the different time in the second schedule occurs subsequent to the scheduled time in the first schedule.

8. The method of claim 5 further comprising determining whether the different time in the second schedule occurs within an availability window associated with the second media asset.

9. The method of claim 1, wherein the first media asset is associated with a first media channel, and wherein the second media asset is associated with a second media channel different from the first media channel.

10. The method of claim 1 further comprising:
generating a program guide screen displaying the first plurality of media assets according to the first schedule; and
in response to the user request to receive the second plurality of media assets according to the second schedule, updating the program guide screen to display the second plurality of media assets according to the second schedule.

11. The method of claim 1 further comprising:
receiving subscription information associated with the user; and
determining, based on the subscription information, a fee associated with the user request to receive the second plurality of media assets according to the second schedule.

12. A system for delivering content to a user, the system comprising:
a processor configured to:
receive, at a current time, a user request to access a content source, wherein the content source is schedule to transmit a first plurality of media assets according to a first schedule;
receive a user request to receive a second plurality of media assets according to a second schedule different than the first schedule; and
identify a first media asset of the first plurality of media assets that is scheduled to be transmitted at the current time according to the first schedule;
identify a second media asset of the second plurality of media assets that is scheduled to be transmitted at the current time according to the second schedule; and
in response to determining that the second media asset is different from the first media asset, automatically receive the second media asset instead of the first media asset.

13. The system of claim 12, wherein the processor is configured to automatically receive the second media asset instead of the first media asset by:
automatically transmitting a communication to a second content source requesting that the second content source make the second media asset available at the current time; and
receiving the second media asset from the second content source.

14. The system of claim 13, wherein the second content source is one of the group of: a television distribution facility, a broadcast provider, a cable system head end, a service provider, a satellite distribution facility, a video on-demand server, an internet server, a website, or a remote recording device.

15. The system of claim 12 wherein the processor is configured to automatically receive the second media asset by automatically receiving the second media asset starting at an intermediate point in the second media asset corresponding to the current time relative to a starting position of the second media asset in the second schedule.

16. The system of claim 12, wherein the processor is configured to receive a user request to receive the second plurality of media assets according to a second schedule by receiving a user input to shift the second media asset from a scheduled time in the first schedule to a different time in the second schedule.

17. The system of claim 16 wherein the different time in the second schedule occurs prior to the scheduled time in the first schedule.

18. The system of claim 16 wherein the different time in the second schedule occurs subsequent to the scheduled time in the first schedule.

19. The system of claim 16 wherein the processor is further configured to determine whether the different time in the second schedule occurs within an availability window associated with the second media asset.

20. The system of claim 12, wherein the first media asset is associated with a first media channel, and wherein the second media asset is associated with a second media channel different from the first media channel.

21. The system of claim 12 wherein the processor is further configured to:
generate a program guide screen displaying the first plurality of media assets according to the first schedule; and
in response to the user request to receive the second plurality of media assets according to the second schedule, update the program guide screen to display the second plurality of media assets according to the second schedule.

22. The system of claim 12 wherein the processor is further configured to:
receive subscription information associated with the user; and
determine, based on the subscription information, a fee associated with the user request to receive the second plurality of media assets according to the second schedule.

* * * * *